US012626674B2

(12) United States Patent
Abe et al.

(10) Patent No.: US 12,626,674 B2
(45) **Date of Patent: *May 12, 2026**

(54) VIBRATION PLATE AND MUSICAL INSTRUMENT

(71) Applicant: YAMAHA CORPORATION, Hamamatsu (JP)

(72) Inventors: Banri Abe, Hamamatsu (JP); Ichiro Osuga, Hamamatsu (JP); Masatsugu Okazaki, Hamamatsu (JP); Shinji Sumino, Hamamatsu (JP); Taishi Shinohara, Hamamatsu (JP); Takashi Kitagawa, Hamamatsu (JP); Takuya Abe, Kakegawa (JP)

(73) Assignee: YAMAHA CORPORATION, Hamamatsu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/944,520

(22) Filed: Nov. 12, 2024

(65) Prior Publication Data

US 2025/0069569 A1 Feb. 27, 2025

Related U.S. Application Data

(63) Continuation of application No. 18/058,013, filed on Nov. 22, 2022, now Pat. No. 12,183,312.

(30) Foreign Application Priority Data

Nov. 26, 2021 (JP) ................................ 2021-192024

(51) Int. Cl.
*G10C 3/06* (2006.01)
*G10C 1/04* (2006.01)

(52) U.S. Cl.
CPC ................ *G10C 3/06* (2013.01); *G10C 1/04* (2013.01)

(58) Field of Classification Search
CPC ...... G10C 3/06; G10C 1/04; G10H 2210/271; G10H 1/045; G10H 3/22; G10H 1/32; G10D 3/02
See application file for complete search history.

(56) References Cited

U.S. PATENT DOCUMENTS

| | | | | |
|---|---|---|---|---|
| 6,133,519 | A | 10/2000 | Mair | |
| 12,183,312 | B2 * | 12/2024 | Abe | G10C 1/04 |
| 2015/0356961 | A1 | 12/2015 | Takahashi et al. | |

FOREIGN PATENT DOCUMENTS

| | | | |
|---|---|---|---|
| WO | 2014115482 | A1 | 7/2014 |

OTHER PUBLICATIONS

Notice of Allowance issued in U.S. Appl. No. 18/058,013, mailed Sep. 26, 2024.

* cited by examiner

*Primary Examiner* — Kimberly R Lockett
(74) *Attorney, Agent, or Firm* — ROSSI, KIMMS & McDOWELL LLP

(57) ABSTRACT

A vibration plate for a musical instrument includes: a plate-shaped vibration plate main body that has a deformation anisotropy property; a first elongated reinforcing member disposed on a first face of the vibration plate main body, and that projects outwardly from the first face and extends along the first face in a direction that prevents the vibration plate main body from deforming; and a second elongated reinforcing member disposed on a second face of the vibration plate main body, and that projects outwardly from the second face and extends along the second face in the direction that prevents the vibration plate main body from deforming. As viewed from a thickness direction of the vibration plate main body, at least part of the first elongated reinforcing member overlaps with at least part of the second elongated reinforcing member.

10 Claims, 12 Drawing Sheets

VIBRATION PLATE AND MUSICAL INSTRUMENT

CROSS-REFERENCE TO RELATED APPLICATIONS

The present application claims priority to Japanese Patent Application No. 2021-192024, filed Nov. 26, 2021, the contents of which are incorporated herein by reference.

BACKGROUND OF THE INVENTION

Field of the Invention

The present disclosure relates to a vibration plate and a musical instrument.

Description of Related Art

Conventionally, some musical instruments emit sound by vibrating a vibration plate such as a soundboard with a vibrator. The vibrator operates according to, for example, an audio signal, and vibrates the vibration plate to produce sound from the vibration plate.

PCT International Publication No. WO 2014/115482 (hereinafter Patent Document 1) discloses a structure in which a vibrator having a driving part and a movable part is attached to a musical instrument having a vibration plate (soundboard). In this vibrator, the movable part is electromagnetically connected to a magnetic path forming part (driving part) composed of magnets, cores, and so forth, and application of an electric current to the coil of the movable part causes the movable part to perform reciprocating motion in a linear direction relative to the magnetic path forming part, thereby causing the vibrator to vibrate. The driving part of the vibrator is fixed to a frame or the like of the musical instrument, and an end of the movable part in a vibration direction is fixed to the vibration plate.

SUMMARY

Incidentally, a vibration plate such as a soundboard expands/contracts or bending-deforms (warping-deforms) due to changes over time associated with the effects of temperature and humidity. Expansion/contraction deformation and bending deformation of the vibration plate are undesirable in musical instruments in which the vibration plate is vibrated by a vibrator.

For example, if bending deformation occurs in the vibration plate, the normal line of a partial region of the vibration plate is inclined. In such a case, the vibration direction of the movable part fixed to the partial region of the vibration plate is inclined with respect to the driving part (magnetic path forming part). In such a state, the movable part may rub against the driving part as the movable part vibrates. If the movable part rubs against the driving part, vibrations caused by the rubbing are transmitted to the vibration plate, and this causes distortion in the sound produced by the vibration plate. That is to say, the bending deformation of the vibration plate affects the characteristics of sound production of the vibration plate performed by the vibrator.

The present disclosure takes into consideration the above circumstances. An example object of the present disclosure is to provide a vibration plate capable of suppressing expansion/contraction deformation and/or bending deformation, and a musical instrument provided therewith.

According to a first aspect of the present disclosure, a vibration plate for a musical instrument includes: a plate-shaped vibration plate main body that has a deformation anisotropy property; a first elongated reinforcing member disposed on a first face of the vibration plate main body, and that projects outwardly from the first face and extends along the first face in a direction that prevents the vibration plate main body from deforming; and a second elongated reinforcing member disposed on a second face of the vibration plate main body, and that projects outwardly from the second face and extends along the second face in the direction that prevents the vibration plate main body from deforming. As viewed from a thickness direction of the vibration plate main body, at least part of the first elongated reinforcing member overlaps with at least part of the second elongated reinforcing member.

According to a second aspect of the present disclosure, a vibration plate for a musical instrument includes: a plate-shaped vibration plate main body that has a deformation anisotropy property; a first elongated reinforcing member disposed on a first face of the vibration plate main body, and that projects outwardly from the first face and extends along the first face in a direction that prevents the vibration plate main body from deforming; and a second elongated reinforcing member disposed on a second face of the vibration plate main body, and that projects outwardly from the second face and extends along the second face in the direction that prevents the vibration plate main body from deforming. The first elongated reinforcing member and the second elongated reinforcing member are laterally spaced apart as viewed from a thickness direction of the vibration plate main body. The lateral spacing between the first elongated reinforcing member and the second elongated reinforcing member is equal to or less than three times a maximum dimension of a cross section of the first elongated reinforcing member, the cross section being orthogonal to a lengthwise direction of the first elongated reinforcing member.

A third exemplary aspect of the present disclosure, a musical instrument includes a vibration plate. The vibration plate includes: a plate-shaped vibration plate main body that has a deformation anisotropy property; a first elongated reinforcing member disposed on a first face of the vibration plate main body, and that projects outwardly from the first face and extends along the first face in a direction that prevents the vibration plate main body from deforming; and a second elongated reinforcing member disposed on a second face of the vibration plate main body, and that projects outwardly from the second face and extends along the second face in the direction that prevents the vibration plate main body from deforming. As viewed from a thickness direction of the vibration plate main body, at least part of the first elongated reinforcing member overlaps with at least part of the second elongated reinforcing member. The musical instrument further includes a vibrator configured to vibrate the vibration plate main body.

EMBODIMENTS FOR CARRYING OUT THE INVENTION

First Embodiment

Hereinafter, a first embodiment of the present disclosure will be described, with reference to FIG. 1 to FIG. 7.

Figure 1:
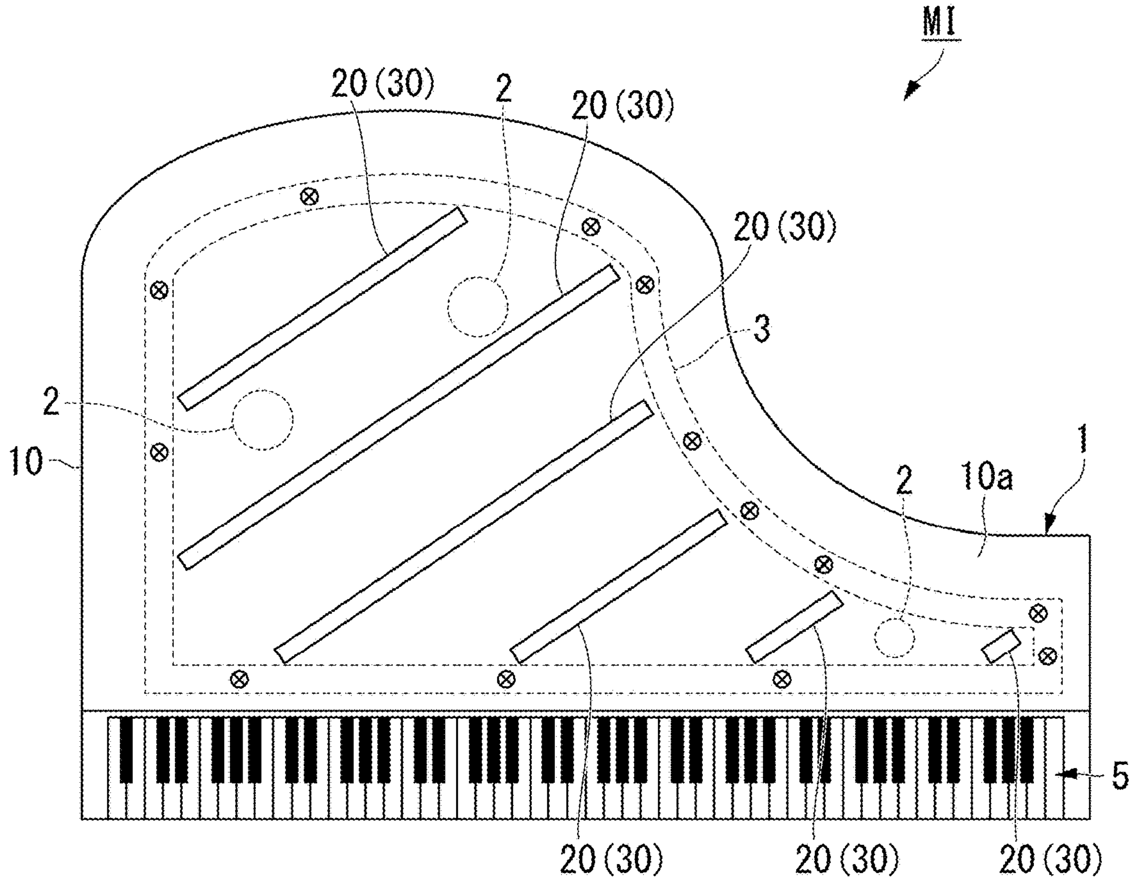
FIG. 1 is a plan view of a musical instrument according to a first embodiment of the present disclosure.
Figure 2:
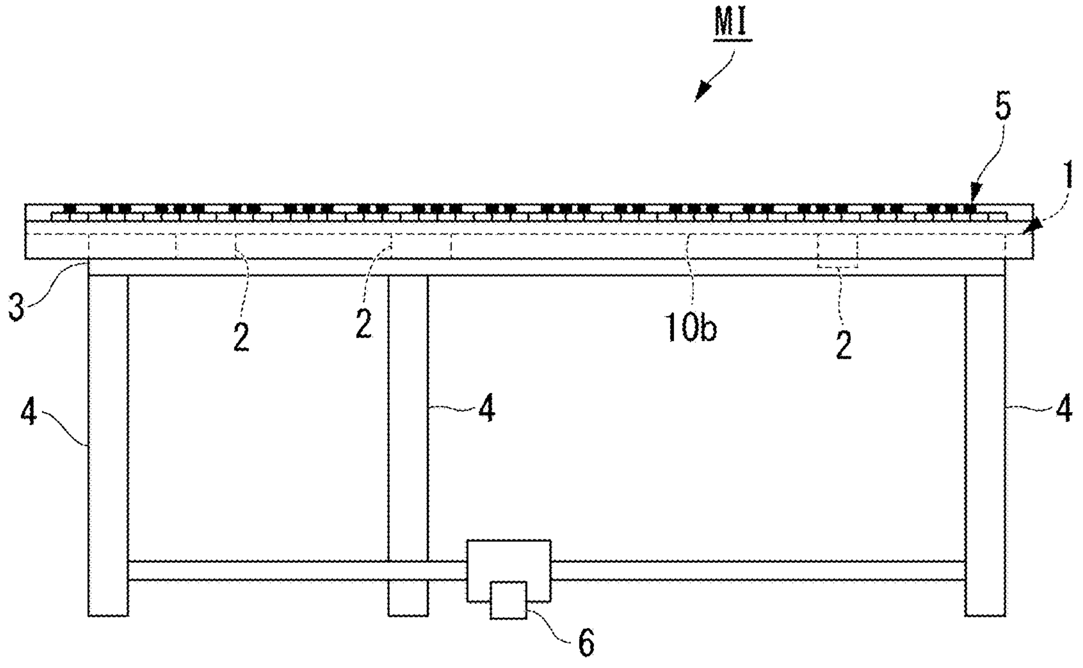
FIG. 2 is a front elevation view of the musical instrument of FIG. 1.

As shown in FIG. 1 and FIG. 2, a musical instrument MI of the present embodiment includes a vibration plate 1 and vibrators 2 that vibrate the vibration plate 1. The musical instrument MI of the present embodiment also includes a frame 3, legs 4, a keyboard 5, and a pedal 6, and is of a configuration similar to that of a grand piano.

In the musical instrument MI of the present embodiment, the keyboard 5 is arranged on the player side (front side) of the musical instrument MI. The keyboard 5 is composed of a plurality of keys that are played and operated by the hands and fingers of the player.

The vibration plate 1 is arranged at the rear of the keyboard 5. The vibration plate 1 of the present embodiment has a planar shape similar to that of a soundboard of a grand piano. A soundboard is arranged so that the thickness direction thereof is oriented in the up-down direction. The details of the vibration plate 1 will be described later.

The vibrators 2 are arranged on the lower side of the vibration plate 1. In the present embodiment, a plurality of the vibrators 2 (three in the illustrated example) are attached to the vibration plate 1. The plurality of vibrators 2 are arranged at intervals in a left-right direction along which a plurality of keys of the keyboard 5 are arranged. The details of the vibrators 2 will be described later.

The frame 3 supports the vibration plate 1 from the lower side. The frame 3 is fixed to the vibration plate 1. The planar shape of the frame 3 is formed in a frame-like shape that conforms substantially to the periphery part of the vibration plate 1. The outline of the frame 3 illustrated in FIG. 1 is slightly smaller than the periphery part of the vibration plate 1 and is formed in a shape similar to that of the vibration plate 1.

Each leg 4 extends downward from the frame 3. The pedal 6 is connected to a lower end part of the legs 4 and is arranged on the player's side (front side). The pedal 6 is played and operated by the player's foot.

In the musical instrument MI of the present embodiment, sound can be produced (emitted) by the vibrators 2 vibrating (exciting) the vibration plate 1 on the basis of playing operations of the keyboard 5 and the pedal 6. It should be noted that in the musical instrument MI of the present embodiment, sound may be produced by the vibrators 2 vibrating the vibration plate 1 on the basis of preliminarily prepared playing data, for example.

Figure 3:
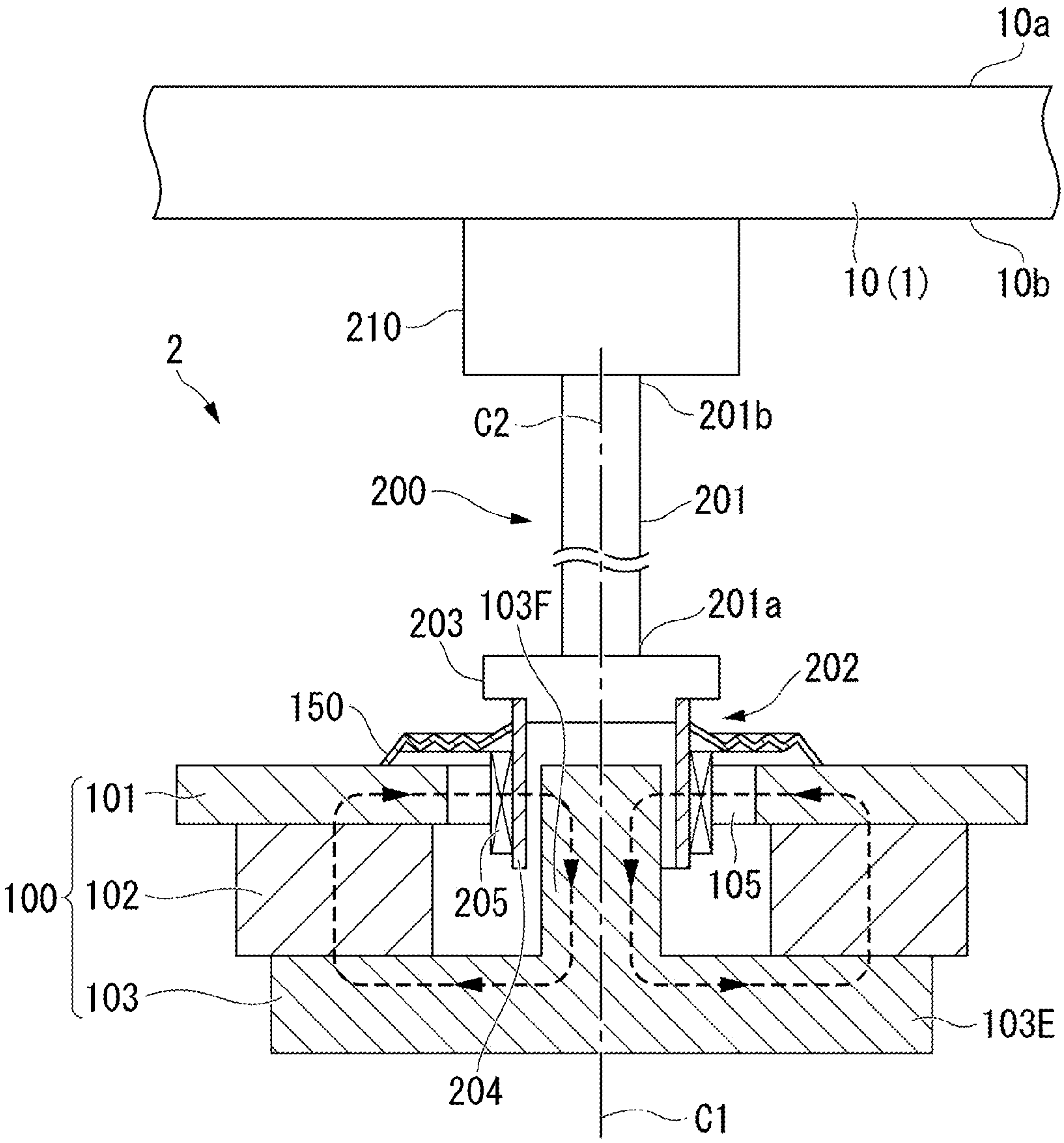
FIG. 3 is a cross-sectional view showing a vibrator provided in the musical instrument of FIG. 1 and FIG. 2.

As shown in FIG. 3, the vibrator 2 of the present embodiment is a voice coil actuator. The up-down direction in FIG. 3 corresponds to the up-down direction in FIG. 2. The vibrator 2 has a magnetic path forming part 100 (driving part) and a movable body 200 (movable part). The movable body 200 has a rod-shaped part 201, a cap 203, a bobbin 204, and a voice coil 205.

The annular bobbin 204 is fixed to the cap 203 by being engaged on a lower part of the cap 203. The voice coil 205 is composed of a conductive wire wound around the outer peripheral surface of the bobbin 204. The voice coil 205 converts the current flowing through the voice coil 205 into vibration in the magnetic field formed by the magnetic path forming part 100. The cap 203, the bobbin 204, and the voice coil 205 constitute an electromagnetic engaging part 202 that electromagnetically engages with the magnetic path forming part 100.

A first end part 201*a*, which is a lower end part of the rod-shaped part 201, is connected and fixed to the cap 203 of the electromagnetic engaging part 202. The rod-shaped part 201 extends upward from the cap 203. A second end part 201*b*, which is an upper end part of the rod-shaped part 201, is fixed to the vibration plate 1 via a connecting part 210 fixed on a lower face of the vibration plate 1 (for example, a second face 10*b* of the vibration plate main body 10 described later). The connecting part 210 serves to transmit vibration of the movable body 200 to the vibration plate 1 by fixedly connecting the second end part 201*b* of the rod-shaped part 201 to the vibration plate 1.

The magnetic path forming part 100 is configured such that a top plate 101, a magnet 102, and a yoke 103 are arranged in this order from the upper side. The electromagnetic engaging part 202 is supported by a damper 150 so as to be movable in the up-down direction (thickness direction of the vibration plate 1) without coming into contact with the magnetic path forming part 100. The damper 150 is formed in a disk shape, for example, from fibers or the like. The disk-shaped portion of the damper 150 is formed in a corrugated bellows-like shape. An outer peripheral end part of the damper 150 is attached to the top plate 101, and an inner peripheral end part of the damper 150 is attached to the electromagnetic engaging part 202. The magnetic path forming part 100 is supported by the frame 3 (see FIG. 1 and FIG. 2) via a supporting member (not shown in the drawings).

The top plate 101 is composed, for example, of a soft magnetic material such as soft iron, and is formed in a disk shape having a hole in the center thereof. The yoke 103 is composed, for example, of a soft magnetic material such as soft iron, and is formed in a shape in which a disk-shaped disk part 103E and a column-shaped columnar part 103F having a smaller outer diameter than the disk part 103E are integrally formed while their axial centers coincide with each other. The outer diameter of the columnar part 103F is smaller than the inner diameter of top plate 101. The magnet 102 is a donut-shaped permanent magnet. The inner diameter of the magnet 102 is greater than the inner diameter of top plate 101. The axial centers of the top plate 101, the magnet 102, and the yoke 103 coincide with each other, and serve as an axial center A1 of the magnetic path forming part 100. Such an arrangement forms a magnetic path indicated by broken-lined arrows in FIG. 3. The electromagnetic engaging part 202 is arranged so that the voice coil 205 is positioned within a magnetic path space 105, which is a space between the top plate 101 and the columnar part 103F. At this time, the electromagnetic engaging part 202 is positioned in the horizontal direction (horizontal direction in FIG. 3) by the damper 150 so that an axial center A2 of the rod-shaped part 201 is concentric with the axial center A1 of the magnetic path forming part 100.

Driving signals on the basis of playing operations or playing data of the keyboard 5 and pedal 6 (see FIG. 1) are input to the vibrator 2. Specifically, a driving signal is input to the voice coil 205. At this time, the voice coil 205 receives a magnetic force in the magnetic path space 105, and a driving force in the up-down direction acts on the bobbin 204 according to the waveform indicated by the driving signal. Therefore, the electromagnetic engaging part 202 is excited by the magnetic path forming part 100, and the electromagnetic engaging part 202 and the rod-shaped part 201 vibrate together in the up-down direction. When the movable body 200 vibrates in the up-down direction, the vibration is transmitted to the vibration plate 1 via the connecting part 210, and the vibration plate 1 is vibrated. The vibration of the vibration plate 1 is emitted into the air to be produced as sound.

Hereinafter, the vibration plate 1 according to the present embodiment will be described, with reference to FIG. 4 to FIG. 7.

Figure 4:
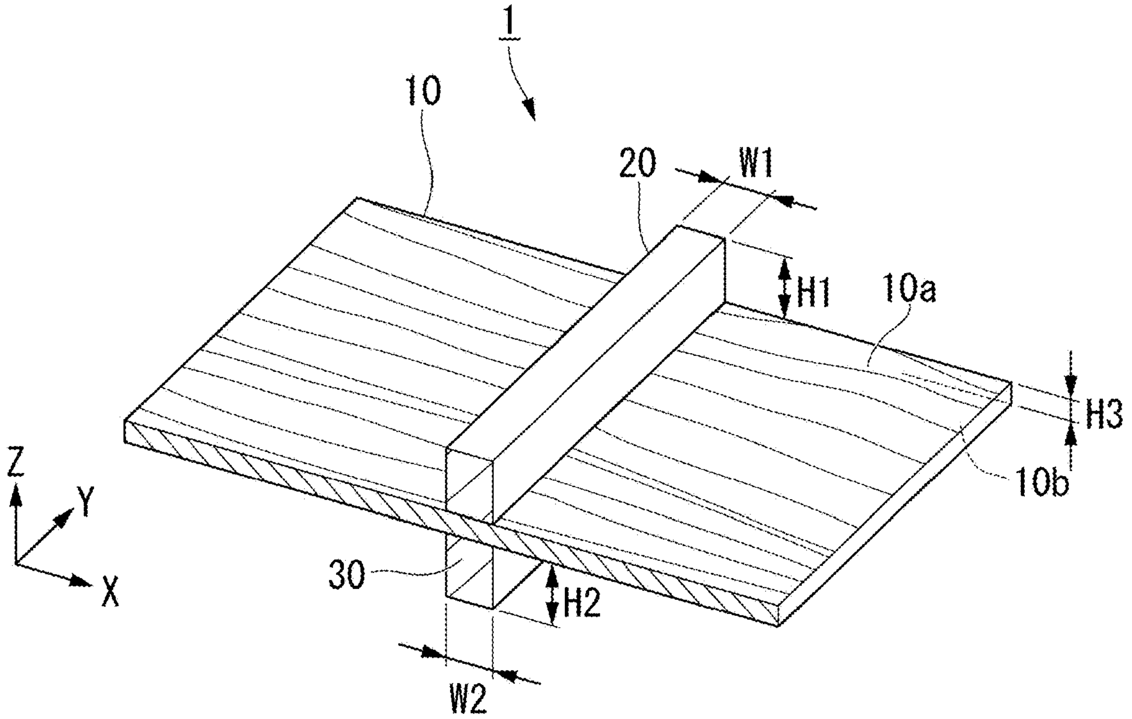
FIG. 4 is a perspective view showing a main part of a vibration plate provided in the musical instrument of FIG. 1 and FIG. 2.
Figure 5:
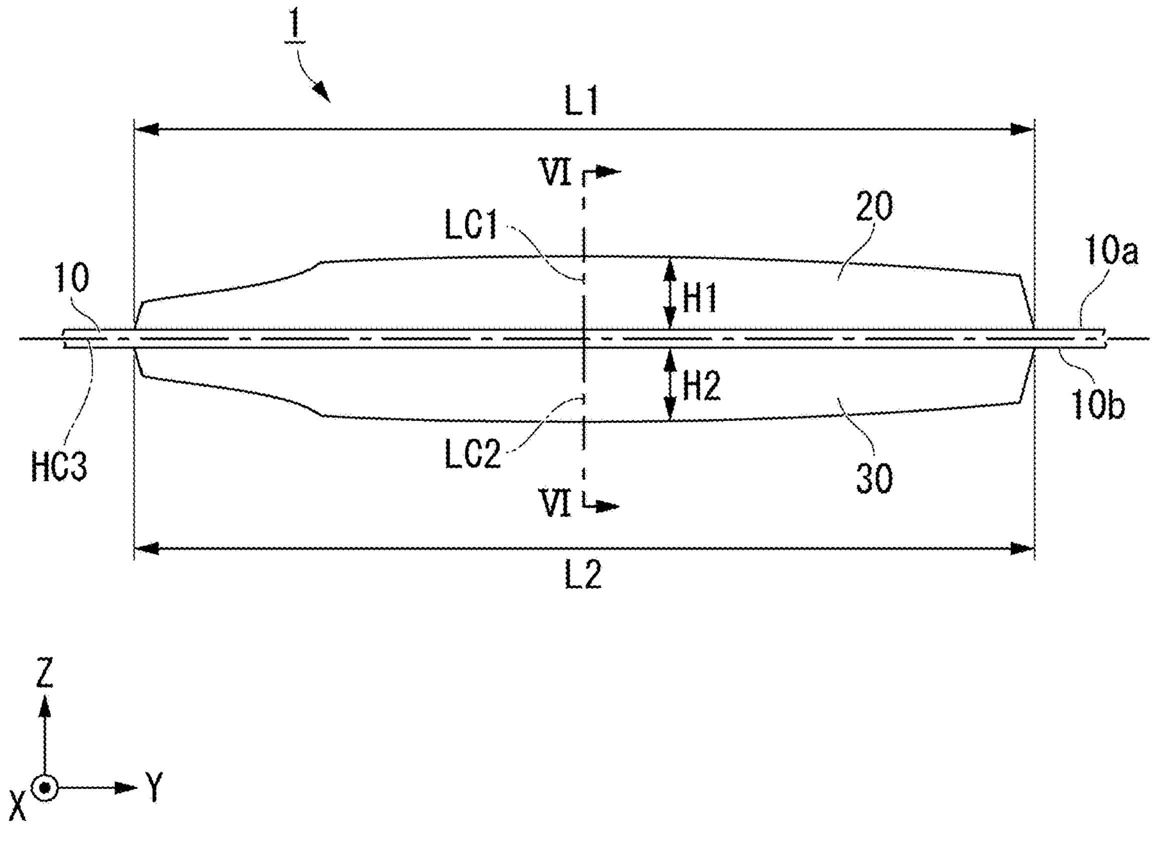
FIG. 5 is a side view showing the main part of a vibration plate provided in the musical instrument of FIG. 1 and FIG. 2.
Figure 6:
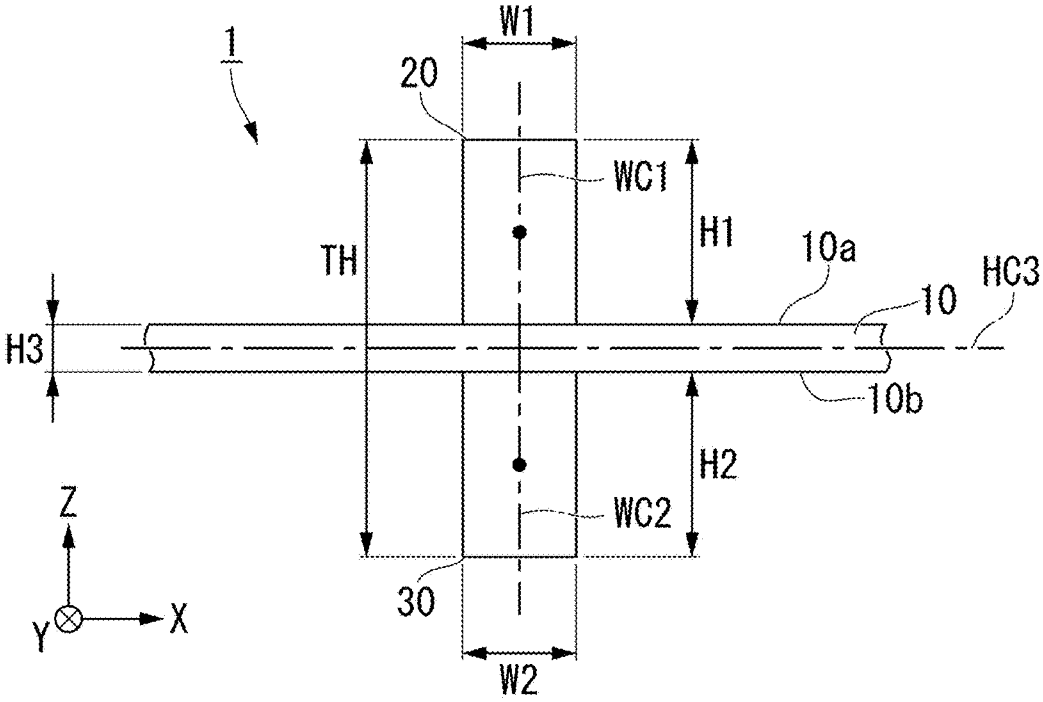
FIG. 6 is a cross-sectional view taken along the line VI-VI in FIG. 5.

As shown in FIG. 4 to FIG. 6, the vibration plate 1 includes a vibration plate main body 10, a first reinforcing member 20, and a second reinforcing member 30.

The vibration plate main body 10 is formed in a plate shape from a material having a linear expansion coefficient anisotropy and a stiffness anisotropy. The vibration plate main body 10 is formed in a flat plate shape in the state where it is not bending deformed. The vibration plate main body 10 has a first face 10*a* and a second face 10*b* oriented in the thickness direction Z thereof. The first face 10*a* and the second face 10*b* each face the opposite side in the thickness direction Z of the vibration plate main body 10. Having a linear expansion coefficient anisotropy means that in the first and second faces 10*a*, 10*b* of the vibration plate main body 10, the linear expansion coefficient in a predetermined direction Y along the first and second faces 10*a*, 10*b* is greater than the linear expansion coefficient in a second direction X along the first and second faces 10*a*, 10*b* orthogonal to the first direction Y. Moreover, having a stiffness anisotropy means that the stiffness of the vibration plate main body 10 in the first direction Y is greater than the stiffness thereof in the second direction X.

In the vibration plate main body 10, having a linear expansion coefficient anisotropy and a stiffness anisotropy means that it has an expansion/contraction deformation anisotropy. Hereinafter, the expansion/contraction deformation anisotropy of plate-shaped members such as the vibration plate main body 10 will be described.

Figure 21:
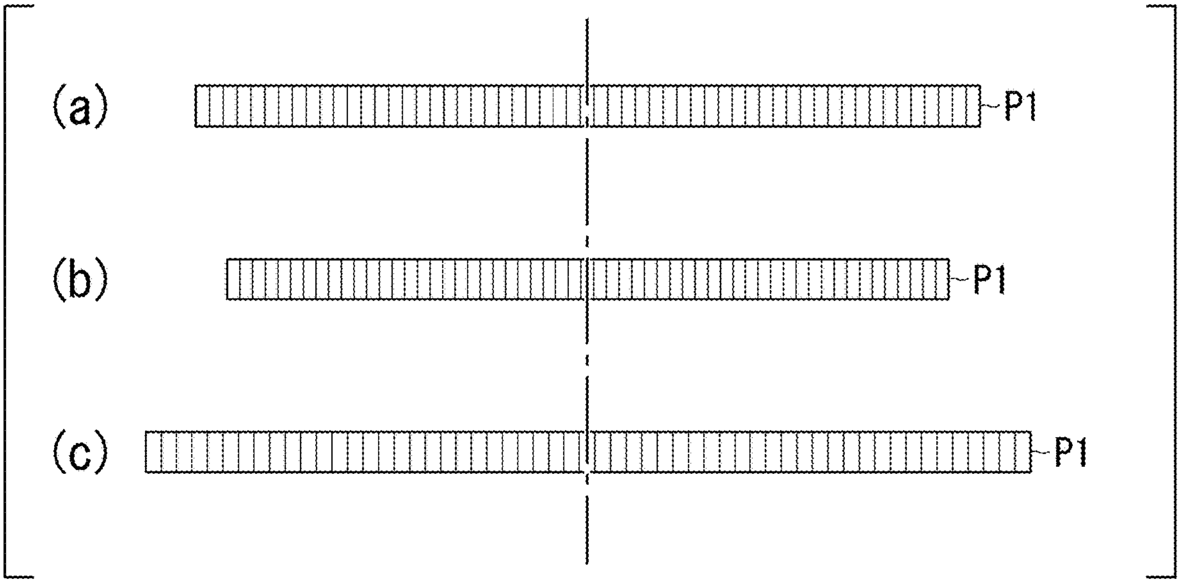
FIG. 21 is a diagram showing changes in the state of one plate member according to dryness and wetness, where Part (a) shows a reference state, Part (b) shows a dry state, and Part (c) shows a wet state.

As shown in FIG. 21, a single (individual) plate member P1 expands and contracts in a direction orthogonal to the thickness direction (up-down direction in FIG. 21) of the plate member P1 when it gets dry or wet. Specifically, when the single plate member P1 becomes dry from the reference state shown in Part (a) of FIG. 21 (when brought into the dry state shown in Part (b) of FIG. 21), it contracts in the direction orthogonal to the thickness direction (left-right direction in FIG. 21). Also, when the single plate member P1 becomes wet from the reference state (when brought into the wet state shown in Part (c) of FIG. 21), it expands in the direction orthogonal to the thickness direction. The single plate member P1 having an expansion/contraction deformation anisotropy means that the length by which the single plate member P1 expands or contracts relative to the reference state as it becomes dry or wet differs between a first orthogonal direction orthogonal to the thickness direction of the plate member P1 and a second orthogonal direction orthogonal to both of the thickness direction of the plate member P1 and the first orthogonal direction.

Bending deformation of the vibration plate main body 10 caused by expansion/contraction deformation means that the vibration plate main body 10 warping-deforms such that the first face 10*a* and the second face 10*b* of the vibration plate main body 10 bend. The vibration plate main body 10 has a linear expansion coefficient anisotropy and a stiffness anisotropy as described above, and thus has a bending deformation (warping-deformation) anisotropy. The vibration plate main body 10 having a bending deformation anisotropy caused by expansion/contraction deformation means that the first direction Y is "a direction in which the vibration plate main body 10 is more likely to undergo expansion/contraction deformation" than the second direction X, and is "a direction in which the vibration plate main body 10 is likely to undergo bending deformation". Hereinafter, bending deformation of plate-shaped members such as the vibration plate main body 10 will be described.

Figure 22:
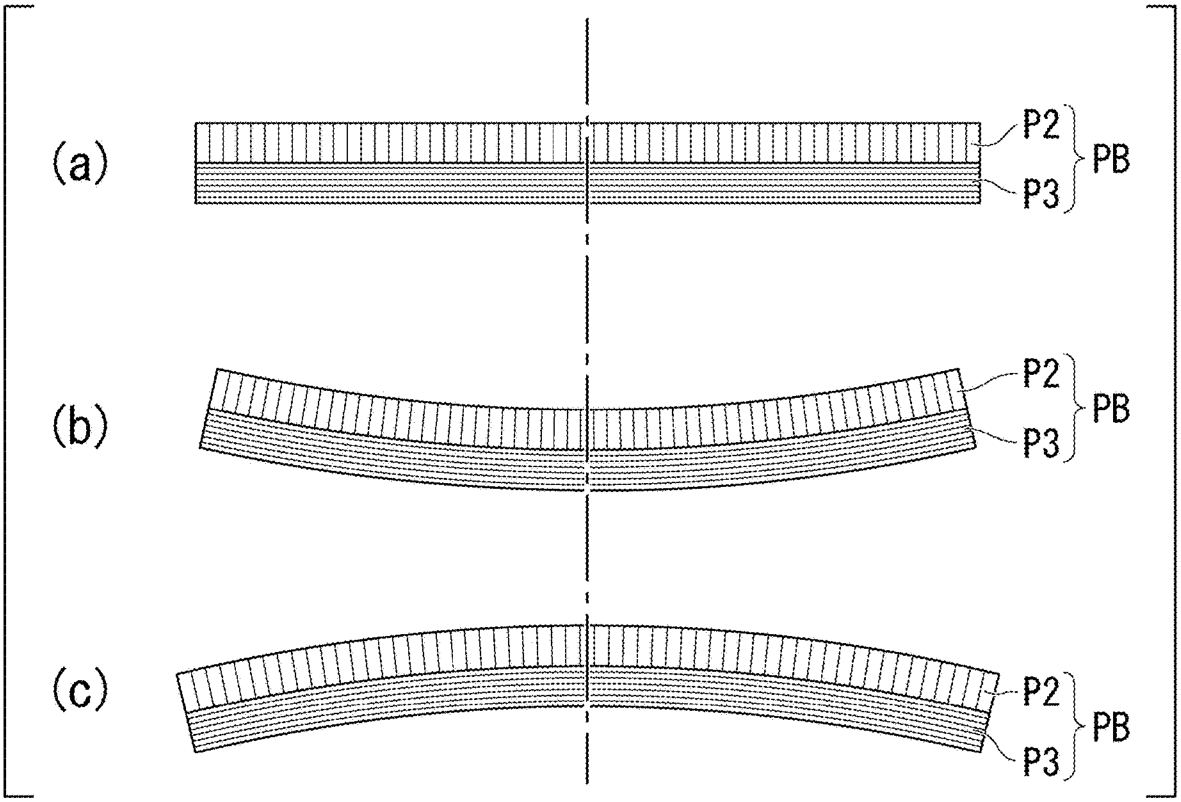
FIG. 22 is a diagram showing changes in the state of a configuration in which two plate members are laminated, according to dryness and wetness, where Part (a) shows a reference state, Part (b) shows a dry state, and Part (c) shows a wet state.

Bending deformation can occur in a plate-shaped member such as the vibration plate main body 10 in a case, for example, where, as shown in FIG. 22, a plate-shaped member PB is configured by laminating individual plate members P2, P3 having an expansion/contraction deformation anisotropy. Specifically, bending deformation occurs in the plate-shaped member PB in a case where directions in which expansion/contraction deformation is likely to occur are orthogonal to each other between the two plate members P2, P3 overlapping with each other. In the plate-shaped member PB illustrated in FIG. 22, the direction in which the upper plate member P2 is likely to expand/contract is the left-right direction, and the direction in which the lower plate member P3 is likely to expand/contract is the direction orthogonal to the plane of the drawing.

When the plate-shaped member PB becomes dry from the reference state shown in Part (a) of FIG. 22 (when brought into the dry state shown in Part (b) of FIG. 22), the upper plate member P2 actively contracts in the left-right direction, however, the lower plate member P3 does not actively contract in the left-right direction. For this reason, although the upper face side of the upper plate member P2 contracts in the left-right direction, the contraction of the lower face side of the upper plate member P2, on which the lower plate member P3 overlaps, in the left-right direction is suppressed by the lower plate member P3. As a result, in the dry state shown in Part (b) of FIG. 22, the plate-shaped member PB undergoes bending deformation so as to protrude downward.

On the other hand, when the plate-shaped member PB becomes wet from the reference state shown in Part (a) of FIG. 22 (when brought into the wet state shown in Part (c) of FIG. 22), the upper plate member P2 actively expands in the left-right direction, however, the lower plate member P3 does not actively expand in the left-right direction. For this reason, although the upper face side of the upper plate member P2 expands in the left-right direction, the expansion of the lower face side of the upper plate member P2, on which the lower plate member P3 overlaps, in the left-right direction is suppressed by the lower plate member P3. As a result, in the wet state shown in Part (c) of FIG. 22, the plate-shaped member PB undergoes bending deformation so as to protrude upward.

In the drawings (FIG. 4 to FIG. 6, and so forth) showing the vibration plate 1, the first direction Y and the second direction X are denoted by straight lines on the premise that the vibration plate main body 10 is not undergoing bending deformation.

The vibration plate main body 10 of the present embodiment is composed of wood having wood grains extending along the first face 10*a* and the second face 10*b*. The wood-grain direction of the vibration plate main body 10 corresponds to the second direction X described above. The vibration plate main body 10, which is composed of wood, is likely to undergo bending deformation in a direction orthogonal to the wood-grain direction (that is, in the first direction Y). It should be noted that the vibration plate main body 10 is not limited to being composed of a wooden material, and may be composed of other materials such as resin or paper.

The first reinforcing member 20 is provided on the first face 10*a* of the vibration plate main body 10 so as to project in the thickness direction Z of the vibration plate main body 10 from the first face 10*a*. The first reinforcing member 20 is formed in an elongated shape extending in the first direction Y along the first face 10*a* of the vibration plate main body 10. A length dimension L1 of the first reinforcing member 20 is sufficiently greater than a height dimension H1 of the first reinforcing member 20 and a width dimension W1 of the first reinforcing member 20.

The first reinforcing member 20 of the present embodiment extends linearly along the first direction Y. That is to say, the first reinforcing member 20 extends in a direction orthogonal to the second direction X, which is the wood-grain direction of the vibration plate main body 10. In the present embodiment, the length dimension L1 of the first reinforcing member 20 is the dimension along the first direction Y. The width dimension W1 of the first reinforcing member 20 is a dimension of the first reinforcing member 20 in the width dimension orthogonal to the lengthwise direction of the first reinforcing member 20 along the first face 10*a*. In the present embodiment, the widthwise direction of the first reinforcing member 20 corresponds to the second direction X. Also, the height dimension H1 of the first reinforcing member 20 corresponds to the thickness direction Z of the vibration plate main body 10.

In the present embodiment, the width dimension W1 of the first reinforcing member 20 is constant over the entire first reinforcing member 20 in the lengthwise direction thereof.

The height dimension H1 of the first reinforcing member 20 may be constant over the entire first reinforcing member 20 in the lengthwise direction thereof, for example. In the present embodiment, as shown in FIG. 5, the height dimension H1 of the first reinforcing member 20 changes according to the position of the first reinforcing member 20 in the lengthwise direction. Specifically, the height dimension H1 of the first reinforcing member 20 at an intermediate portion in the lengthwise direction of the first reinforcing member 20 is the largest. Also, the height dimension H1 of the first reinforcing member 20 decreases with approach from the intermediate portion in the lengthwise direction of the first reinforcing member 20 to both ends thereof. The height dimension H1 of the first reinforcing member 20 is preferably larger than a thickness dimension H3 of the vibration plate main body 10, and more preferably three times the thickness dimension H3 of the vibration plate main body 10, for example.

As shown in FIG. 6, the cross-sectional shape of the first reinforcing member 20 orthogonal to the lengthwise direction of the first reinforcing member 20 is a rectangular shape with the height dimension H1 thereof being greater than the width dimension W1 thereof. Therefore, the cross-sectional shape of the first reinforcing member 20 is line-symmetrical in the widthwise direction thereof. The dashed-dotted line denoted by reference symbol WC1 in FIG. 6 is a center line WC1 of the first reinforcing member 20 in the widthwise direction of the first reinforcing member 20. The cross-sectional shape of the first reinforcing member 20 is a shape line-symmetrical about the center line WC1.

As shown in FIG. 4 to FIG. 6, the second reinforcing member 30 is provided on the second face 10*b* of the vibration plate main body 10 so as to project in the thickness direction Z of the vibration plate main body 10 from the second face 10*b*. That is to say, the second reinforcing member 30 projects from the vibration plate main body 10 in a direction opposite to the first reinforcing member 20. The second reinforcing member 30 is formed in an elongated shape extending in the first direction Y along the second face 10*b* of the vibration plate main body 10. A length dimension L2 of the second reinforcing member 30 is sufficiently greater than a height dimension H2 of the second reinforcing member 30 and a width dimension W2 of the second reinforcing member 30.

As with the first reinforcing member 20, the second reinforcing member 30 of the present embodiment extends linearly along the first direction Y. That is to say, the second reinforcing member 30 extends in a direction orthogonal to the second direction X, which is the wood-grain direction of the vibration plate main body 10. In the present embodiment, the length dimension L2 of the second reinforcing member 30 is the dimension along the first direction Y. The width dimension W2 of the second reinforcing member 30 is a dimension of the second reinforcing member 30 in the width dimension orthogonal to the lengthwise direction of the second reinforcing member 30 along the second face 10*b*. In the present embodiment, the widthwise direction of the second reinforcing member 30 corresponds to the second direction X. Also, the height dimension H2 of the second reinforcing member 30 corresponds to the thickness direction Z of the vibration plate main body 10.

The second reinforcing member 30 may be formed in a shape different from that of the first reinforcing member 20, for example. The shape of the second reinforcing member 30 of the present embodiment is the same as that of the first reinforcing member 20. That is to say, the width dimension W2 of the second reinforcing member 30 is constant over the entire second reinforcing member 30 in the lengthwise direction thereof. Moreover, the height dimension H2 of the second reinforcing member 30 changes according to the position of the second reinforcing member 30 in the lengthwise direction. As with the first reinforcing member 20, the height dimension H2 of the second reinforcing member 30 is preferably larger than a thickness dimension H3 of the vibration plate main body 10, and more preferably three times the thickness dimension H3 of the vibration plate main body 10, for example.

Also, as shown in FIG. 6, the cross-sectional shape of the second reinforcing member 30 orthogonal to the lengthwise direction of the second reinforcing member 30 is a rectangular shape with the height dimension H2 thereof being greater than the width dimension W2 thereof. Therefore, the cross-sectional shape of the second reinforcing member 30 is line-symmetrical in the widthwise direction thereof. The dashed-dotted line denoted by reference symbol WC2 in FIG. 6 is a center line WC2 of the second reinforcing member 30 in the widthwise direction of the second reinforcing member 30. The cross-sectional shape of the second reinforcing member 30 is a shape line-symmetrical about the center line WC2.

In the present embodiment, the stiffnesses of the first reinforcing member 20 and the second reinforcing member 30 are equal to each other. Moreover, the specific gravities of the first reinforcing member 20 and the second reinforcing member 30 are equal to or less than the specific gravity of the vibration plate main body 10. Also, the first reinforcing member 20 and the second reinforcing member 30 are composed of the same material.

In the present embodiment, the first reinforcing member 20 and the second reinforcing member 30 are composed of a wooden material. The wood-grain directions of the first reinforcing member 20 and the second reinforcing member 30 are the same. The wood-grain direction of the first reinforcing member 20 and the wood-grain direction of the second reinforcing member 30 may be completely the same, or may be slightly inclined from each other. It should be noted that the first reinforcing member 20 and the second reinforcing member 30 are not limited to being composed of a wooden material, and may be composed of another material such as resin (for example, CFRP).

As shown in FIG. 6, the cross-sectional shape of the first reinforcing member 20 and the cross-sectional shape of the second reinforcing member 30 are identical (that is to say, rectangular). Moreover, a cross-sectional area of the first reinforcing member 20 orthogonal to the lengthwise direction of the first reinforcing member 20 and a cross-sectional area of the second reinforcing member 30 orthogonal to the lengthwise direction of the second reinforcing member 30 are equal to each other. Furthermore, the cross-sectional shape of the first reinforcing member 20 and the cross-sectional shape of the second reinforcing member 30 are the same including the size thereof.

Accordingly, the cross-sectional shape of the first reinforcing member 20 and the cross-sectional shape of the second reinforcing member 30 are line-symmetrical to each other in the thickness direction Z of the vibration plate main body 10. The dashed-dotted line denoted by reference symbol HC3 in FIG. 6 is a center line HC3 of the vibration plate main body 10 in the thickness direction Z of the vibration plate main body 10. The cross-sectional shape of the first reinforcing member 20 and the cross-sectional shape of the second reinforcing member 30 are formed line-symmetrical to each other about the center line HC3.

Moreover, in the present embodiment, as shown in FIG. 5, the shapes of the first and second reinforcing members 20, 30 as viewed from the widthwise direction (second direction X) of the first and second reinforcing members 20, 30 are also line-symmetrical to each other about the center line HC3 of the vibration plate main body 10.

The first reinforcing member 20 and the second reinforcing member 30 are overlapped with each other as viewed from the thickness direction Z of the vibration plate main body 10. In the present embodiment, as shown in FIG. 5, the length dimension L1 of the first reinforcing member 20 and the length dimension L2 of the second reinforcing member 30 are equal to each other. Also, the positions of the first and second reinforcing members 20, 30 in the lengthwise direction (first direction Y) of the first and second reinforcing members 20, 30 match with each other. Moreover, the lengthwise directions of the first and second reinforcing members 20, 30 are parallel with each other. Therefore, the first reinforcing member 20 and the second reinforcing member 30 overlap with each other over the entire lengths thereof. Furthermore, the first reinforcing member 20 and the second reinforcing member 30 are arranged so as to be line-symmetrical to each other in the lengthwise directions thereof.

The dashed-dotted line denoted by reference symbol LC1 in FIG. 5 is a center line LC1 of the first reinforcing member 20 in the lengthwise direction of the first reinforcing member 20. Also, the dashed-dotted line denoted by reference symbol LC2 is a center line LC2 of the second reinforcing member 30 in the lengthwise direction of the second reinforcing member 30. In FIG. 5, the center lines LC1, LC2 of the first and second reinforcing members 20, 30 coincide with each other. Accordingly, the first reinforcing member 20 and the second reinforcing member 30 are arranged so as to be line-symmetrical to each other in the lengthwise directions thereof.

In the present embodiment, as shown in FIG. 6, the position of the first reinforcing member 20 and the position of the second reinforcing member 30 coincide with each other in the widthwise direction. That is to say, the center lines WC1, WC2 of the first and second reinforcing members 20, 30 in the widthwise direction coincide with each other. Also, the width dimensions W1, W2 of the first and second reinforcing members 20, 30 are equal to each other. Therefore, the first reinforcing member 20 and the second reinforcing member 30 overlap with each other over the entire widths thereof.

Furthermore, in the present embodiment, the cross-sectional shape that includes both the first and second reinforcing members 20, 30 in the cross section orthogonal to the lengthwise direction (first direction Y) of the first and second reinforcing members 20, 30 is line-symmetrical in the widthwise direction. That is to say, the cross-sectional shape including both the first and second reinforcing members 20, 30 is symmetrical about the center lines WC1, WC2 of the first and second reinforcing members 20, 30 in the widthwise direction.

Moreover, in the present embodiment, in the thickness direction Z of the vibration plate main body 10, a length TH (total length TH) from a distal end of the first reinforcing member 20 in the projecting direction to a distal end of the second reinforcing member 30 in the projecting direction is preferably five times or more the thickness dimension H3 of the vibration plate main body 10. The total length TH mentioned above corresponds to the sum of the height dimensions H1, H2 of the first and second reinforcing members 20, 30 and the thickness dimension H3 of the vibration plate main body 10.

Moreover, in the present embodiment, in each of the reinforcing members 20, 30 (reinforcing members constituting the first reinforcing member 20 and the second reinforcing member 30), it is preferable that the following expression is satisfied:

$$0.5 \le HMAX/WMAX \le 4.0$$

where HMAX is the maximum height dimension of the reinforcing members 20, 30 and WMAX is the maximum width dimension of the reinforcing members 20, 30.

HMAX/WMAX is more preferably approximately 2.0, for example.

The reinforcing members 20, 30 of the vibration plate 1 may be arranged so as not to interfere with the mounting positions of the vibrators 2 with respect to the vibration plate main body 10 in the musical instrument MI shown in FIG. 1. Moreover, the reinforcing members 20, 30 of the vibration plate 1 may be arranged on the inner side of the frame-shaped frame 3 as viewed from the thickness direction Z of the vibration plate main body 10, as illustrated in FIG. 1. Also, as illustrated in FIG. 1, a plurality of sets of the first reinforcing member 20 and the second reinforcing member 30 may be arranged side by side at intervals in the widthwise direction of the reinforcing members 20, 30. The plurality of sets of the first reinforcing member 20 and the second reinforcing member 30 may be parallel to each other as illustrated in FIG. 1, however they need not be parallel to each other, for example.

As described above, in the vibration plate 1 of the present embodiment, on the first face 10*a* of the vibration plate main body 10 there is provided the elongated first reinforcing member 20 that projects from the first face 10*a* and extends in the direction (first direction Y) in which deformation (expansion/contraction deformation and/or bending deformation) is likely to occur in the vibration plate main body 10. Moreover, on the second face 10*b* of the vibration plate main body 10 there is provided the elongated second reinforcing member 30 that projects from the second face 10*b* and extends in the direction in which deformation (expansion/contraction deformation and/or bending deformation) is likely to occur in the vibration plate main body 10. Furthermore, the first reinforcing member 20 and the second reinforcing member 30 are overlapped with each other as viewed from the thickness direction Z of the vibration plate main body 10. As a result, the first and second reinforcing members 20, 30 effectively prevent the vibration plate main body 10 from expanding/contracting in the direction in which expansion/contraction deformation is likely to occur therein, or from bending in the direction in which bending deformation is likely to occur. This point will be described below.

Figure 7:
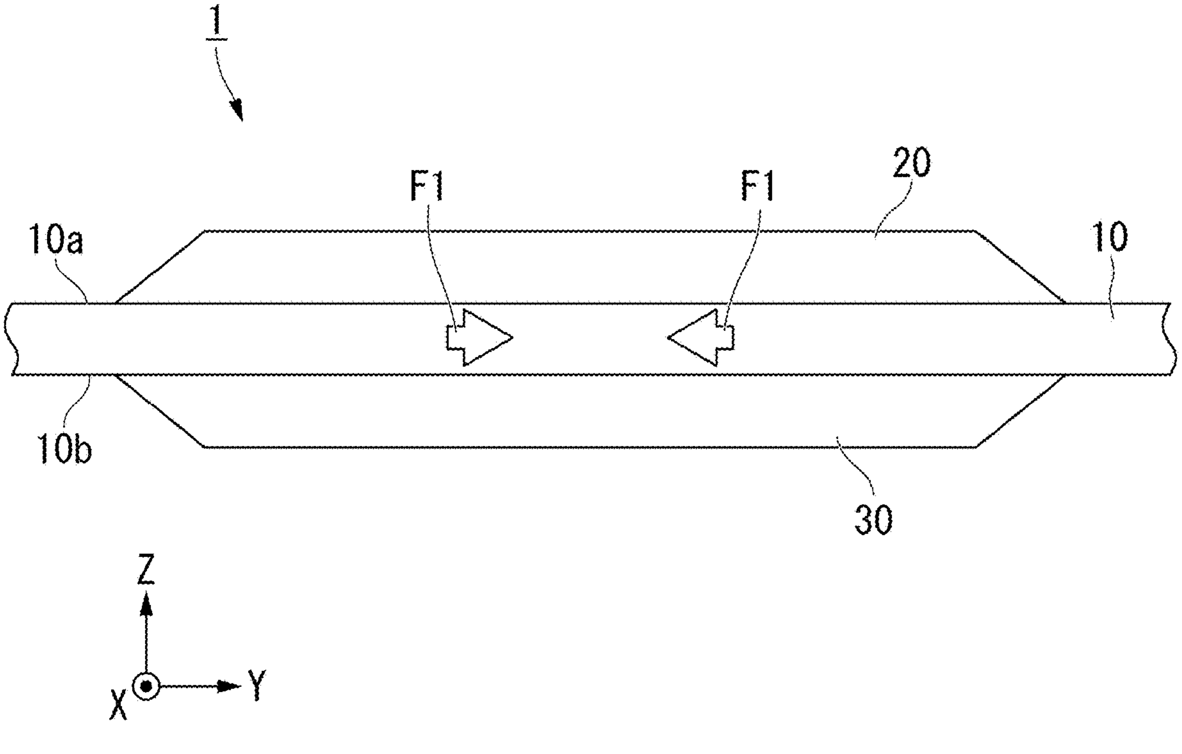
FIG. 7 is a schematic diagram for describing that bending deformation of the vibration plate shown in FIG. 4 to FIG. 6 can be suppressed.

For example, as shown in FIG. 7, when stresses (forces denoted by arrows F1) that cause the vibration plate main body 10 to contract in a direction (first direction Y) in which the vibration plate main body 10 is likely to undergo expansion/contraction deformation act on the vibration plate main body 10 due to dryness or the like, the first reinforcing member 20 suppresses the stresses occurring on the first face 10*a* side of the vibration plate main body 10, thereby suppressing contraction of the portion of the vibration plate main body 10 on the first face 10*a* side. Also, the second reinforcing member 30 suppresses the stresses occurring on the second face 10*b* side of the vibration plate main body 10, thereby suppressing contraction of the portion of the vibration plate main body 10 on the second face 10*b* side.

Moreover, although not shown in the drawings, when stresses that cause the vibration plate main body 10 to expand in a direction (first direction Y) in which the vibration plate main body 10 is likely to undergo expansion/contraction deformation act on the vibration plate main body 10 due to wetness or the like, the first reinforcing member 20 suppresses the stresses occurring on the first face 10*a* side of the vibration plate main body 10, thereby suppressing expansion of the portion of the vibration plate main body 10 on the first face 10*a* side. Also, the second reinforcing member 30 suppresses the stresses occurring on the second face 10*b* side of the vibration plate main body 10, thereby suppressing expansion of the portion of the vibration plate main body 10 on the second face 10*b* side.

As a result, expansion/contraction deformation of the vibration plate main body 10 in the first direction Y due to dryness, wetness, or the like of the vibration plate main body 10 can be effectively suppressed. Moreover, it is possible to effectively suppress the vibration plate main body 10 from bending in the direction in which bending deformation is likely to occur due to the expansion/contraction deformation.

Furthermore, in the vibration plate 1 of the present embodiment, the vibration plate main body 10 is composed of wood having wood grains extending along the first face 10*a* and the second face 10*b*. Therefore, the vibration plate main body 10 is likely to undergo expansion/contraction deformation in the direction orthogonal to the wood-grain direction (the first direction Y). On the other hand, the first and second reinforcing members 20, 30 each extend in directions intersecting with the wood-grain direction so as to overlap with each other. As a result, it is possible by means of the first and second reinforcing members 20, 30 to effectively suppress the vibration plate main body 10 from undergoing expansion/contraction deformation in the direction orthogonal to the wood-grain direction.

Also, in the vibration plate 1 of the present embodiment, the stiffnesses of the first and second reinforcing members 20, 30 are equal to each other. Therefore, the forces for preventing expansion/contraction deformation or bending deformation caused by expansion/contraction deformation from occurring in the vibration plate main body 10 can be made matched (or equalized) between the first reinforcing member 20 and the second reinforcing member 30. As a result, it is possible to more effectively prevent expansion/contraction deformation or bending deformation caused by expansion/contraction deformation from occurring in the vibration plate main body 10.

Also, in the vibration plate 1 of the present embodiment, the materials of the first and second reinforcing members 20, 30 are the same. Therefore, by simply forming the first and second reinforcing members 20, 30 in the same shape and size, the forces for preventing expansion/contraction deformation or bending deformation caused by expansion/contraction deformation from occurring in the vibration plate main body 10 can easily be made matched (or equalized) between the first reinforcing member 20 and the second reinforcing member 30.

Moreover, in the vibration plate 1 of the present embodiment, the first and second reinforcing members 20, 30 have the same stiffness and the same material, and the cross-sectional areas of the first and second reinforcing members 20, 30 orthogonal to the lengthwise direction are equal to each other. Therefore, even if the first reinforcing member 20 and the second reinforcing member 30 have different cross-sectional shapes, the first reinforcing member 20 and the second reinforcing member 30 have the same characteristics in that the reinforcing members 20, 30 undergo expansion/contraction deformation in the lengthwise direction thereof in response to changes in temperature or humidity. Accordingly, it is possible to prevent the effect of suppressing expansion/contraction deformation or bending deformation caused by expansion/contraction deformation from occurring in the vibration plate main body 10 from becoming different between the first face 10*a* side and the second face 10*b* side of the vibration plate main body 10. As a result, it is possible to preferably prevent expansion/contraction deformation or bending deformation caused by expansion/contraction deformation from occurring in the vibration plate main body 10.

Moreover, in the vibration plate 1 of the present embodiment, the first reinforcing member 20 and the second reinforcing member 30 are arranged so as to be line-symmetrical to each other in the lengthwise directions of the first and second reinforcing members 20, 30. As a result, even if the length dimension L1 is different between the first reinforcing member 20 and the second reinforcing member 30, or the arrangement manners of the first reinforcing member 20 and the second reinforcing member 30 are different, it is still possible to effectively prevent expansion/contraction deformation or bending deformation caused by expansion/contraction deformation from occurring in the vibration plate main body 10.

In the vibration plate 1 of the present embodiment, in the case where the total length TH from the distal end of the first reinforcing member 20 in the projecting direction to the distal end of the second reinforcing member 30 in the projecting direction is five times or more the thickness dimension H3 of the vibration plate main body 10, the moment of inertia of area of the two reinforcing members 20, 30 in the thickness direction Z of the vibration plate main body 10 is large with respect to the vibration plate main body 10. As a result, it is possible by means of the two reinforcing members 20, 30 to effectively prevent expansion/contraction deformation or bending deformation caused by expansion/contraction deformation from occurring in the vibration plate main body 10.

Moreover, in the vibration plate 1 of the present embodiment, in the case where the ratio HMAX/WMAX between the maximum height dimension HMAX and the maximum width dimension WMAX of the reinforcement members 20, 30 (reinforcement members constituting the first and second reinforcement members 20, 30) is 0.5 or more, it is possible to suppress warping (up-down warping) of the reinforcing members 20, 30 in the thickness direction Z of the vibration plate main body 10. Also, when HMAX/WMAX is 4.0 or less, warping (left-right warping) of the reinforcing members 20, 30 in the widthwise direction can be suppressed. That is to say, the moment of inertia of area of the reinforcing members 20, 30 in each of the thickness direction Z of the vibration plate main body 10 and the widthwise direction of the reinforcing members 20, 30 can be maintained in good balance. Thus, up-down warping and left-right warping of the reinforcing members 20, 30 can be effectively suppressed, and as a result, it is possible to effectively prevent expansion/contraction deformation or bending deformation caused by expansion/contraction deformation from occurring in the vibration plate main body 10 on the basis of the up-down warping or left-right warping of the reinforcing members 20, 30.

Also, in the case where HMAX/WMAX is approximately 2 (the height dimensions H1, H2 of the reinforcing members 20, 30 are approximately twice the width dimensions W1, W2), it is possible to effectively increase the stiffness of the reinforcing members 20, 30 (specific stiffness of the reinforcing members 20, 30) on the basis of the stiffness of the vibration plate main body 10. As a result, it is possible to more effectively prevent expansion/contraction deformation from occurring in the vibration plate main body 10. Furthermore, it is possible to more effectively prevent the vibration plate main body 10 from bending in the direction in which bending deformation is likely to occur due to the expansion/contraction deformation.

Moreover, in the vibration plate 1 of the present embodiment, also in the case where the specific gravity of the reinforcing members 20, 30 is equal to or less than the specific gravity of the vibration plate main body 10, the specific stiffness of the reinforcing members 20, 30 can be increased. As a result, it is possible to more effectively prevent expansion/contraction deformation from occurring in the vibration plate main body 10. Furthermore, it is possible to more effectively prevent the vibration plate main body 10 from bending in the direction in which bending deformation is likely to occur due to the expansion/contraction deformation.

Moreover, in the vibration plate 1 of the present embodiment, also in the case where the height dimension of the reinforcing members 20, 30 is three times the thickness dimension H3 of the vibration plate main body 10, the specific stiffness of the reinforcing members 20, 30 can be increased. As a result, it is possible to more effectively prevent expansion/contraction deformation from occurring in the vibration plate main body 10. Furthermore, it is possible to more effectively prevent the vibration plate main body 10 from bending in the direction in which bending deformation is likely to occur due to the expansion/contraction deformation.

According to the musical instrument MI of the present embodiment, the vibrators 2 are attached to the vibration plate 1, in which expansion/contraction deformation or bending deformation are effectively suppressed as described above. Therefore, it is possible to suppress changes in the sound production characteristics of the vibration plate 1 caused by the vibrators 2, on the basis of expansion/contraction deformation or bending deformation of the vibration plate 1.

Figure 8:
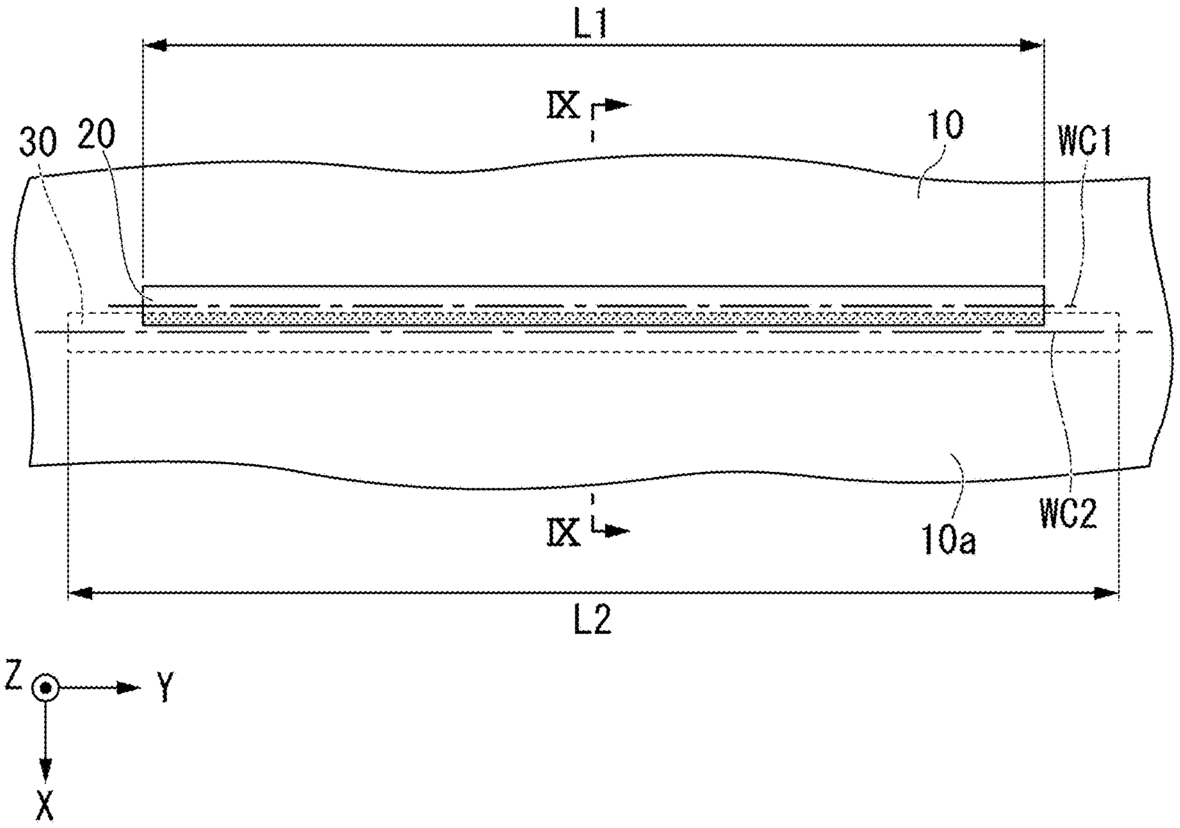
FIG. 8 is a plan view showing a first modified example of the vibration plate of the first embodiment.
Figure 9:
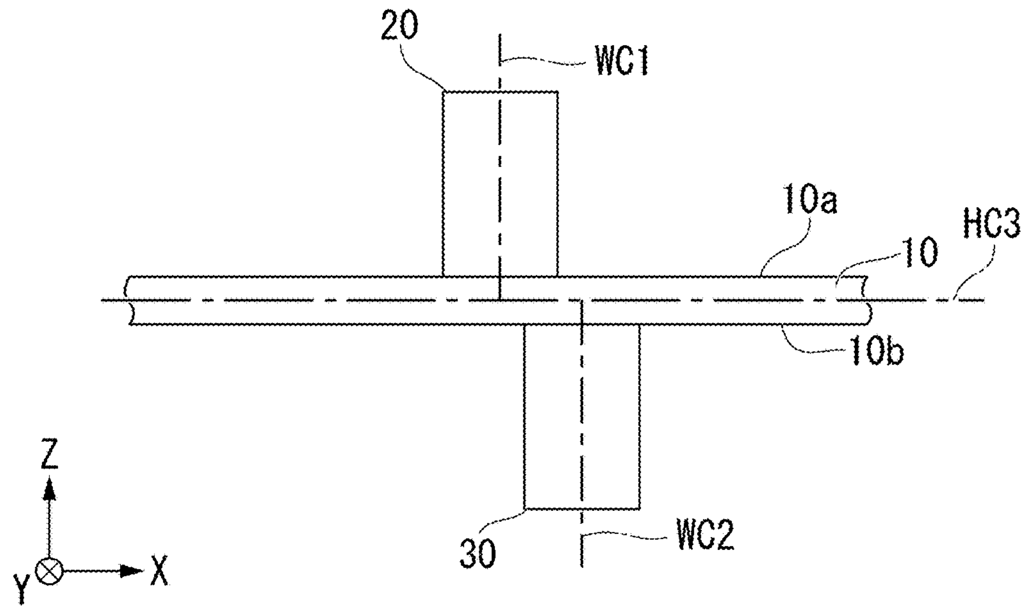
FIG. 9 is a cross-sectional view taken along the line IX-IX in FIG. 8.

In the first embodiment, for example, as shown in FIG. 8 and FIG. 9, only parts of the first reinforcing member 20 and the second reinforcing member 30 in the widthwise direction may overlap with each other as viewed from the thickness direction Z of the vibration plate main body 10. In the configuration illustrated in FIG. 8 and FIG. 9, the center lines WC1, WC2 in the widthwise direction of the first and second reinforcing members 20, 30 are offset from each other, and as a result, only parts in the widthwise direction of the first reinforcing member 20 and the second reinforcing member 30 overlap with each other. In FIG. 8, the area where the first reinforcing member 20 and the second reinforcing member 30 overlap is denoted by linear hatching.

Also, for example, parts in the widthwise direction of the first and second reinforcing members 20, 30 may overlap over the entire length of one of the first and second reinforcing members 20, 30. In the configuration illustrated in FIG. 8, by making the length dimension L1 of the first reinforcing member 20 shorter than the length dimension L2 of the second reinforcing member 30, parts in the widthwise direction of the first and second reinforcing members 20, 30 are overlapped over the entire length of the first reinforcing member 20.

Even with the configuration illustrated in FIG. 8 and FIG. 9, as with the above embodiment, it is possible to effectively prevent expansion/contraction deformation or bending deformation caused by expansion/contraction deformation from occurring in the vibration plate main body 10.

However, a higher ratio of the size of the portion where the first and second reinforcing members 20, 30 overlap with each other in the widthwise direction, to the width dimension of one of the reinforcing members 20, 30 is preferred. The higher the ratio of the size of the portion where the first and second reinforcing members 20, 30 overlap with each other in the widthwise direction, to the width dimension of one of the reinforcing members 20, 30, the more effectively expansion/contraction deformation or bending deformation caused by expansion/contraction deformation can be prevented from occurring in the vibration plate main body 10. That is to say, it is most preferable that the first and second reinforcing members 20, 30 overlap with each other over the entire width of one of them as illustrated in FIG. 6.

Figure 10:
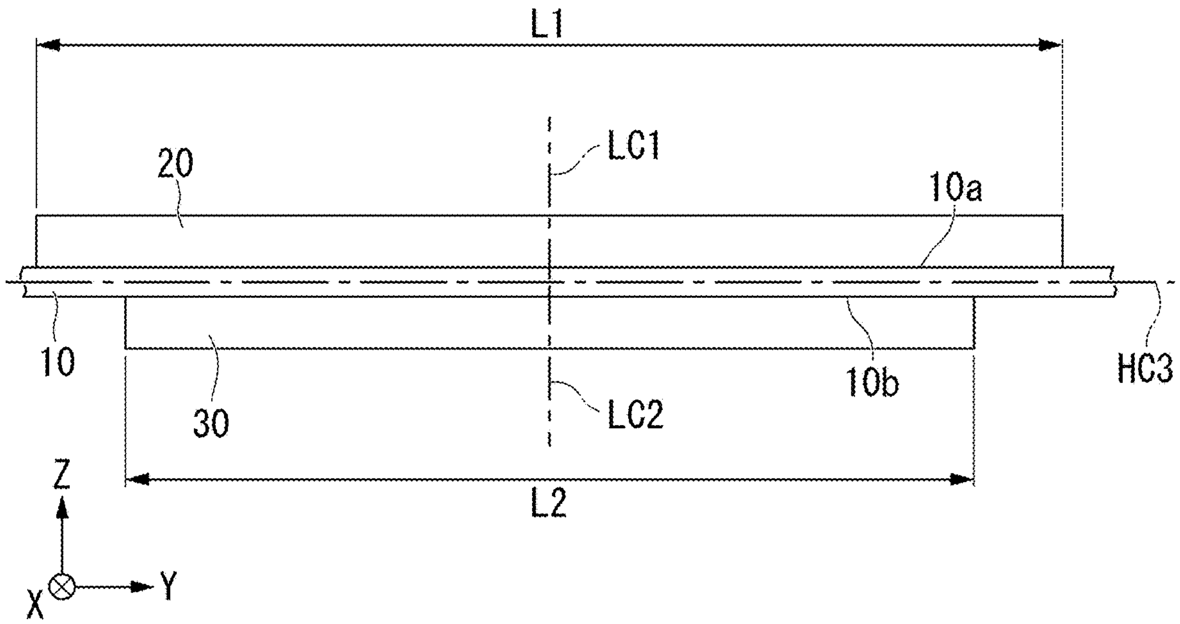
FIG. 10 is a side view showing a second modified example of the vibration plate of the first embodiment.

In the first embodiment, the length dimensions L1, L2 of the first and second reinforcing members 20, 30 may be different as shown in FIG. 10, for example. In FIG. 10, the length dimension L1 of the first reinforcing member 20 is shorter than the length dimension L2 of the second reinforcing member 30. In the configuration illustrated in FIG. 10, the center line LC1 of the first reinforcing member 20 and the center line LC2 of the second reinforcing member 30 in the lengthwise direction coincide with each other. That is to say, the first reinforcing member 20 and the second reinforcing member 30 are arranged so as to be line-symmetrical to each other in the lengthwise directions thereof. Therefore, the same effect as that of the first embodiment described above can be obtained.

Figure 11:
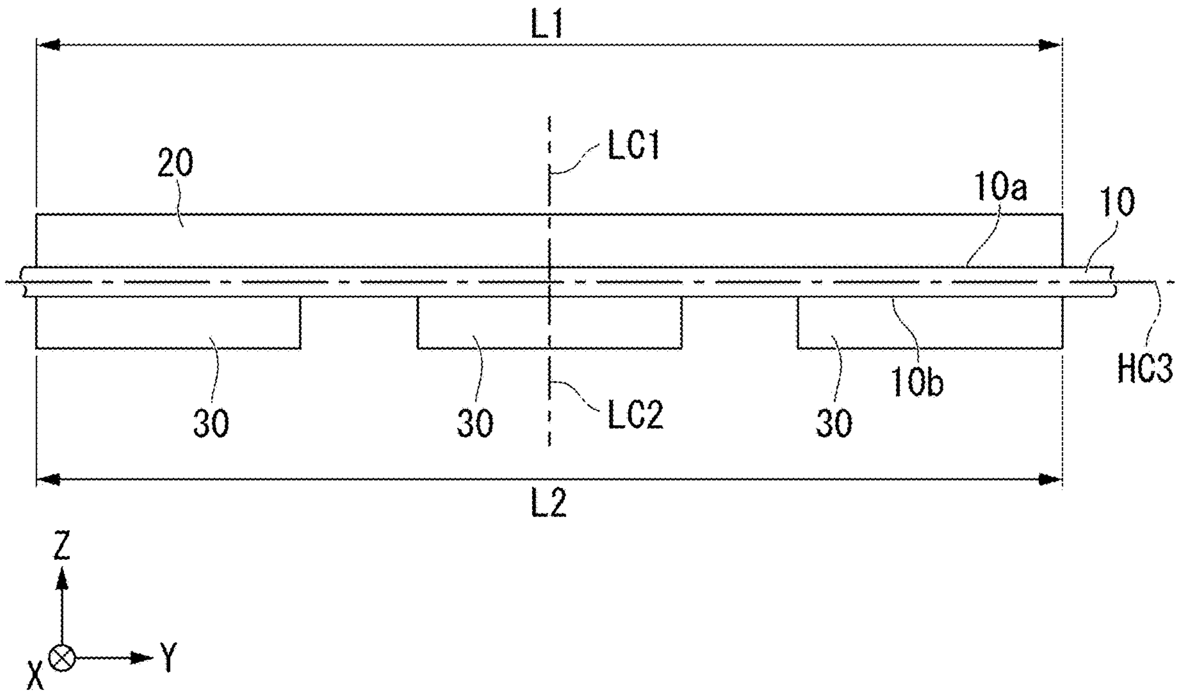
FIG. 11 is a side view showing a third modified example of the vibration plate of the first embodiment.

In the first embodiment, for example, the first reinforcing member 20 and the second reinforcing member 30 may be arranged differently as shown in FIG. 11. In FIG. 11, one first reinforcing member 20 is arranged on the first face 10*a* of the vibration plate main body 10, whereas the second reinforcing member 30 is divided into and arranged as a plurality of (three in FIG. 11) members in the lengthwise direction. In the configuration illustrated in FIG. 11, the center line LC1 of the first reinforcing member 20 and the center line LC2 of the second reinforcing member 30 in the lengthwise direction coincide with each other. That is to say, the first reinforcing member 20 and the second reinforcing member 30 are arranged so as to be line-symmetrical to each other in the lengthwise directions thereof. Therefore, the same effect as that of the first embodiment described above can be obtained.

In FIG. 11, the total length dimension L2 of the second reinforcing member 30, which is divided into a plurality of members, is equal to the length dimension L1 of the first reinforcing member 20, however, it may be different, for example.

Figure 12:
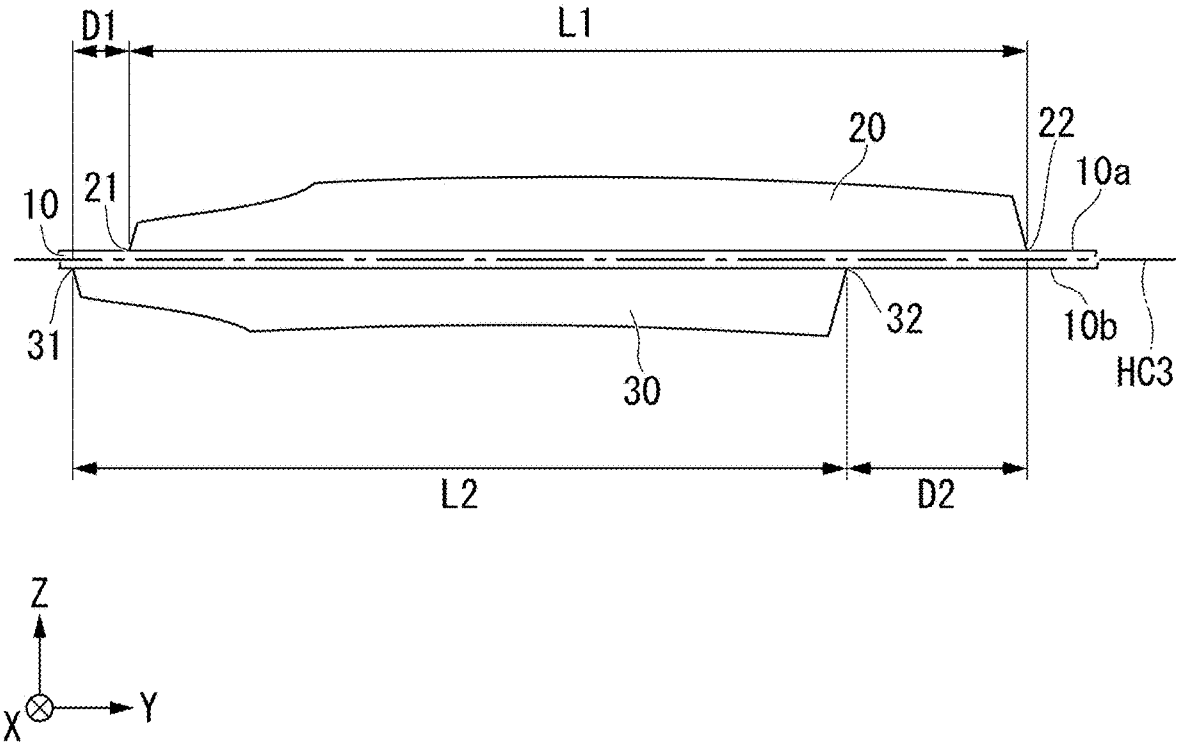
FIG. 12 is a side view showing a fourth modified example of the vibration plate of the first embodiment.

In the first embodiment, the positions of the first reinforcing member 20 and the second reinforcing member 30 may be offset from each other in the lengthwise direction (first direction Y) of the reinforcing members 20, 30 as shown in FIG. 12, for example. In such a case, a distance D1 (first distance D1) between a first end part 21 of the first reinforcing member 20 and a first end part 31 of the second reinforcing member 30, which are positioned on one end side in the lengthwise direction, and a distance D2 (second distance D2) between a second end part 22 of the first reinforcing member 20 and a second end part 32 of the second reinforcing member 30, which are positioned on the other end side in the lengthwise direction, are both preferably not more than 20% of the length dimension of the longer reinforcing member among the first and second reinforcing members 20, 30. In the configuration illustrated in FIG. 12, the length dimension L1 of the first reinforcing member 20 is longer than the length dimension L2 of the second reinforcing member 30. Therefore, the first distance D1 and the second distance D2 mentioned above are preferably not more than 20% of the length dimension L1 of the first reinforcing member 20.

Figure 13:
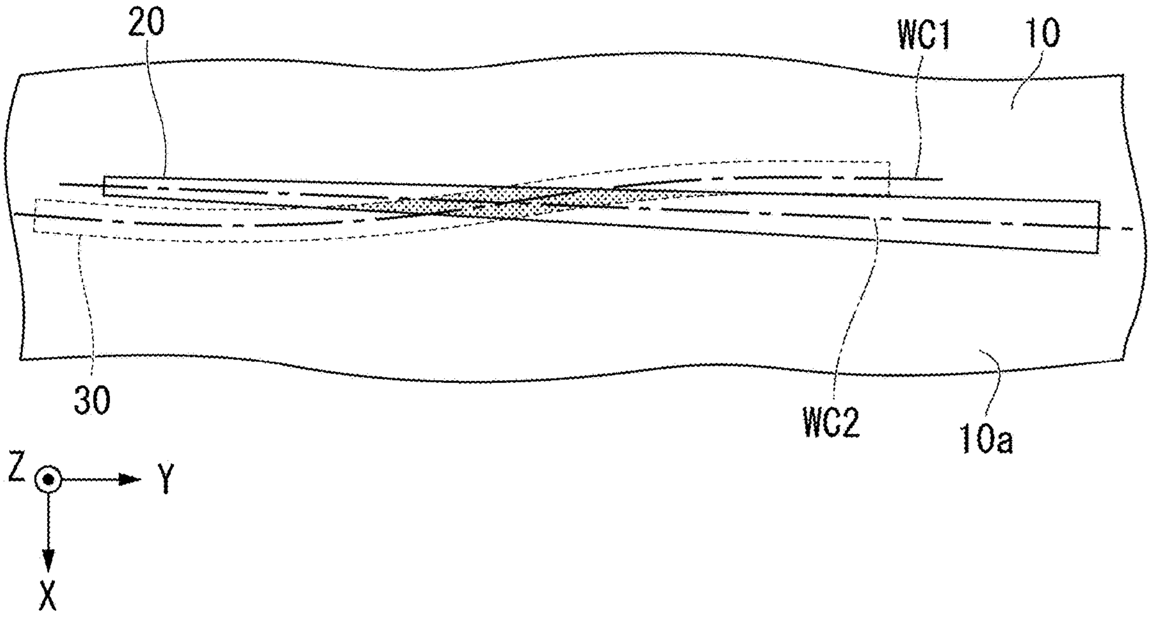
FIG. 13 is a plan view showing a fifth modified example of the vibration plate of the first embodiment.

In the first embodiment, for example, as shown in FIG. 13, the first and second reinforcing members 20, 30 may overlap with each other in parts in the lengthwise direction thereof as viewed from the thickness direction Z of the vibration plate main body 10. In FIG. 13, the first and second reinforcing members 20, 30 intersect with each other so that intermediate parts in the lengthwise direction of the first and second reinforcing members 20, 30 overlap with each other. In FIG. 13, the area where the first reinforcing member 20 and the second reinforcing member 30 overlap is denoted by linear hatching. In FIG. 13, the first and second reinforcing members 20, 30 overlap with each other over the entire width direction thereof, however, only parts in the widthwise direction of the first and second reinforcing members 20, 30 may overlap with each other, for example. Also, the first and second reinforcing members 20, 30 may overlap with each other, for example, at end parts in the lengthwise direction of the first and second reinforcing members 20, 30.

Even with the configuration in which the first and second reinforcing members 20, 30 overlap with each other at parts in the lengthwise direction thereof, as with the first embodiment, it is possible by means of the first and second reinforcing members 20, 30 to prevent the vibration plate main body 10 from expanding or contracting in the first direction Y (the direction in which the vibration plate main body 10 is likely to undergo expansion/contraction deformation), or from bending in the first direction (the direction in which the vibration plate main body 10 is likely to undergo bending deformation).

However, the ratio of the length of the portion where the first and second reinforcing members 20, 30 overlap with each other to the entire length of one of the reinforcing members 20, 30 is preferably high, and is more preferably, for example, 50% or higher. The higher the ratio of the length of the portion where the first and second reinforcing members 20, 30 overlap with each other to the entire length of one of the reinforcing members 20, 30, the more effectively expansion/contraction deformation or bending deformation can be prevented from occurring in the vibration plate main body 10. That is to say, it is most preferable that the first and second reinforcing members 20, 30 overlap with each other over the entire length of at least one of them as illustrated in FIG. 6 and FIG. 8.

In the first embodiment, the first and the second reinforcing members 20, 30 may intersect with the first direction Y (the direction in which the vibration plate main body 10 is likely to undergo deformation (expansion/contraction deformation and/or bending deformation)) as shown in FIG. 13, for example. However, the lengthwise inclination angle of the first and second reinforcing members 20, 30 with respect to the first direction Y is preferably smaller than the lengthwise inclination angle of the first and second reinforcing members 20, 30 with respect to the second direction X. That is to say, the first and second reinforcing members 20, 30 preferably extend mainly in the first direction Y.

Also, the first and second reinforcing members 20, 30 are not limited to linearly extending mainly in the first direction Y, and may be formed in elongated shapes that extend mainly in the first direction Y while bending (meandering) in the second direction X, for example. In FIG. 13, the first reinforcing member 20 extends linearly, and the second reinforcing member 30 extends mainly in the first direction Y while bending (meandering) in the second direction X.

In the first embodiment, the width dimension of the reinforcing members 20, 30 (first and second reinforcing members 20, 30) may vary in the lengthwise direction of the reinforcing members 20, 30, for example. In FIG. 13, the width dimension of the first reinforcing member 20 increases with approach from one end side to the other end side in the lengthwise direction (from left end side to right end side in FIG. 13). It should be noted that the width dimension of the second reinforcing member 30 that meanders in the second direction X is constant over the entire second reinforcing member 30 in the lengthwise direction thereof.

Figure 14:
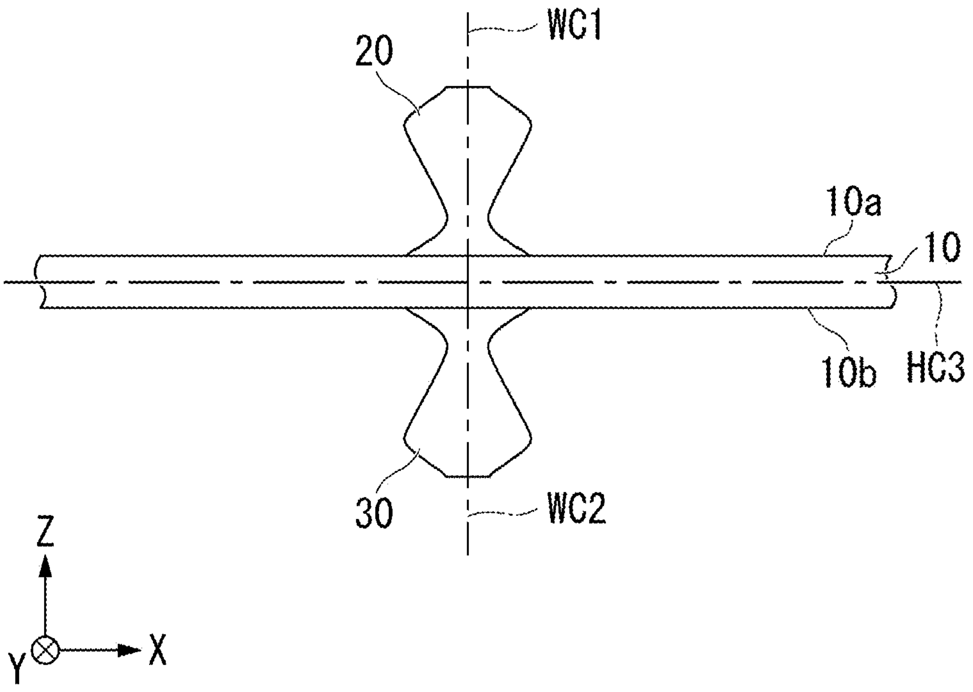
FIG. 14 is a cross-sectional view showing a sixth modified example of the vibration plate of the first embodiment.

In the first embodiment, the cross-sectional shapes of the reinforcing members 20, 30 orthogonal to the lengthwise direction of the reinforcing members 20, 30 are not limited to rectangular shapes, and may be arbitrary shapes. For example, as shown in FIG. 14, the reinforcing members 20 and 30 may be formed to have cross-sectional shapes having a constriction at a proximal end part in the height direction (thickness direction Z) of the reinforcing members 20, 30. The cross-sectional shapes of the reinforcing members 20, 30 are line-symmetrical in the widthwise direction as with the above first embodiment. Moreover, in FIG. 14, as with the first embodiment, the cross-sectional shape of the first reinforcing member 20 and the cross-sectional shape of the second reinforcing member 30 are line-symmetrical to each other in the thickness direction Z of the vibration plate main body 10.

Figure 15:
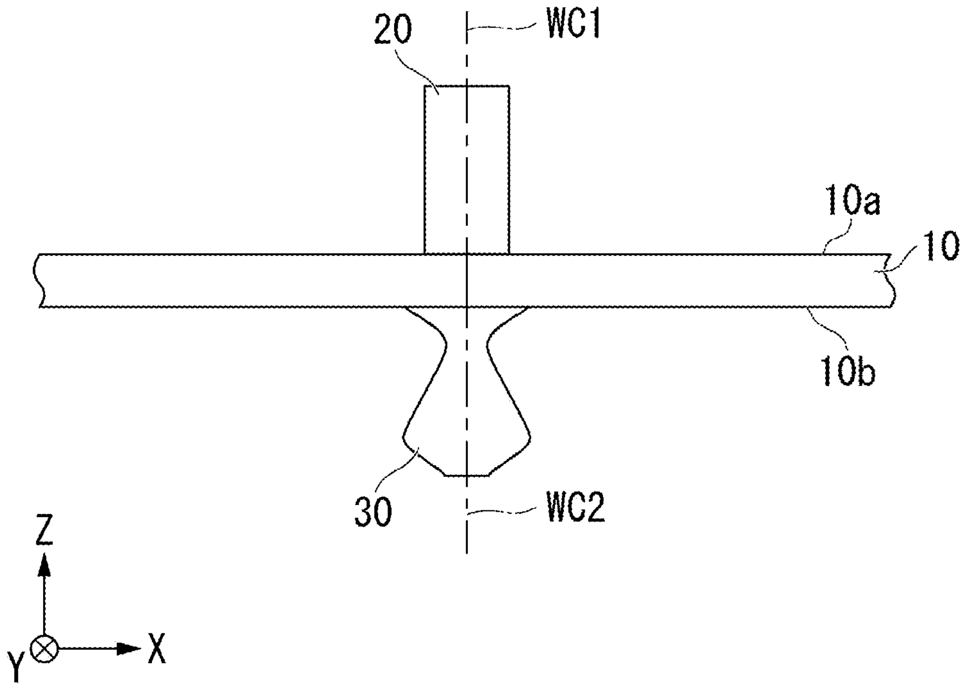
FIG. 15 is a cross-sectional view showing a seventh modified example of the vibration plate of the first embodiment.
Figure 16:
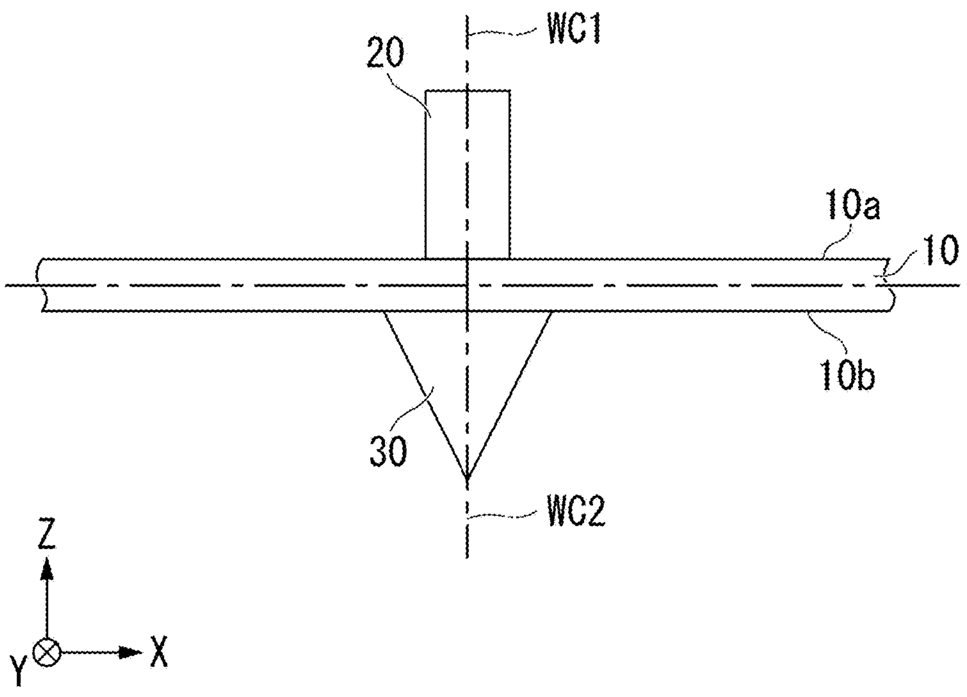
FIG. 16 is a cross-sectional view showing an eighth modified example of the vibration plate of the first embodiment.

In the first embodiment, for example, as shown in FIG. 15 and FIG. 16, the cross-sectional shapes of the reinforcing members 20, 30 orthogonal to the lengthwise direction of the reinforcing members 20, 30 may differ between the first reinforcing member 20 and the second reinforcing member 30. In FIG. 15, the cross-sectional shape of the first reinforcing member 20 is rectangular, and the cross-sectional shape of the second reinforcing member 30 has a constriction at the proximal end part in the height direction of the second reinforcing member 30 as with FIG. 14. In FIG. 16, the cross-sectional shape of the first reinforcing member 20 is rectangular, and the cross-sectional shape of the second reinforcing member 30 is triangular. Even with such a configuration, in the case where the cross-sectional areas of the first and second reinforcing members 20, 30 orthogonal to the lengthwise direction are equal to each other, the same effect as that of the first embodiment described above can be obtained.

Figure 17:
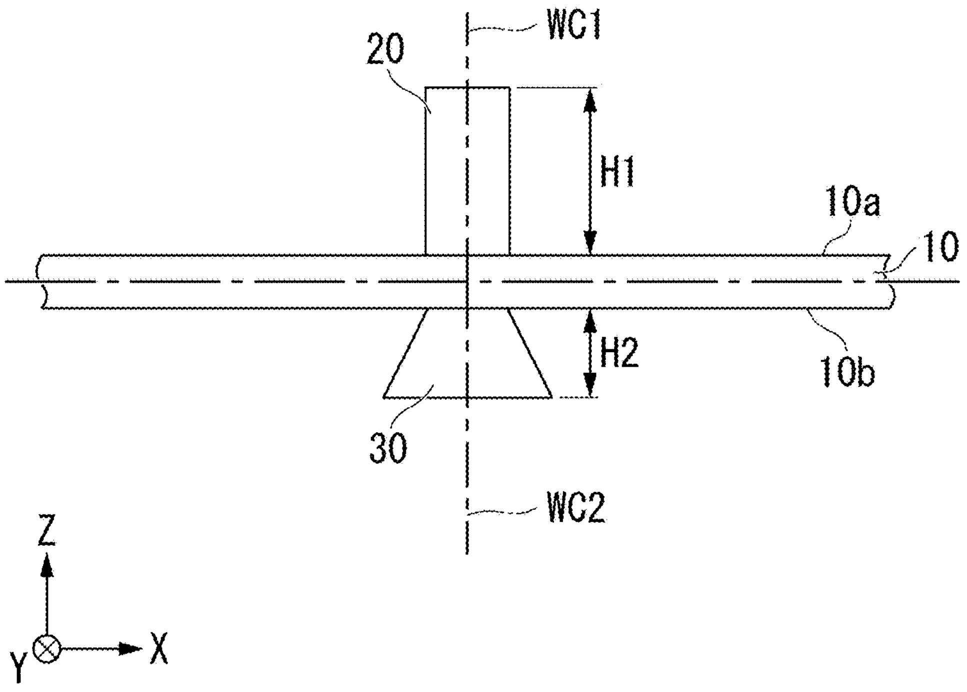
FIG. 17 is a cross-sectional view showing a ninth modified example of the vibration plate of the first embodiment.

In the first embodiment, for example, as shown in FIG. 17, in the cross-sectional shapes of the reinforcing members 20, 30 orthogonal to the lengthwise direction of the reinforcing members 20, 30, the height dimension H1 of the first reinforcing member 20 and the height dimension H2 of the second reinforcing member 30 may be different from each other. In FIG. 17, the height dimension H2 of the second reinforcing member 30 is smaller than the height dimension H1 of the first reinforcing member 20. With such a configuration, in the case where the vibrators 2 are attached to the second face 10*b* of the vibration plate main body 10, interference of the vibrators 2 with the second reinforcing member 30 having a smaller height dimension can be effectively suppressed.

It should be noted that even in the case where the height dimension H1 of the first reinforcing member 20 and the height dimension H2 of the second reinforcing member 30 are different from each other as illustrated in FIG. 17, if the cross-sectional areas of the first and second reinforcing members 20, 30 are equal to each other, the same effect as that of the first embodiment described above can be obtained.

Second Embodiment

Next, a second embodiment of the present disclosure will be described, with reference mainly to FIG. 18 and FIG. 19. In the second embodiment, components similar to those in the first embodiment are denoted by the same reference symbols, and descriptions thereof will be omitted.

Figure 18:
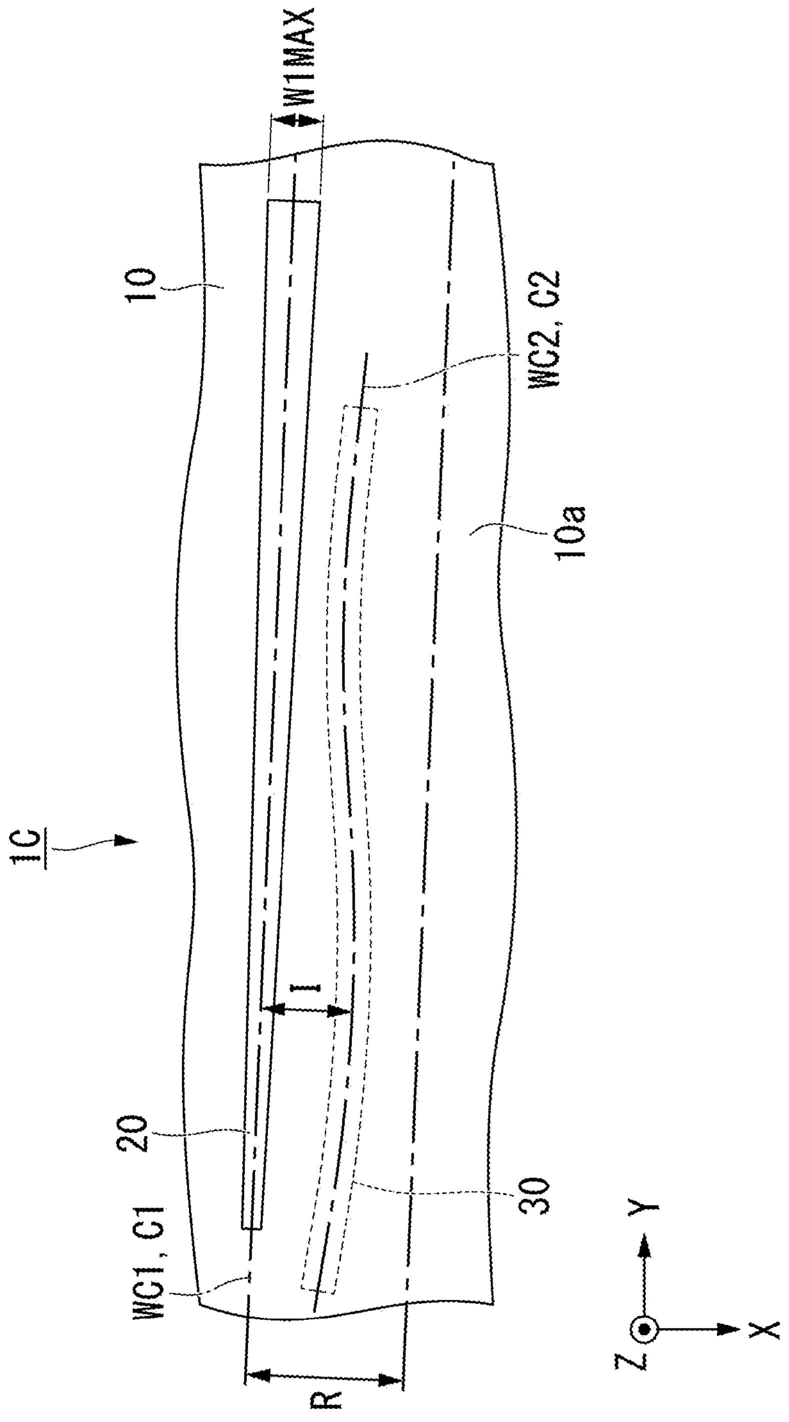
FIG. 18 is a plan view showing a first example of a vibration plate of a second embodiment of the present disclosure.

FIG. 18 shows a vibration plate 1C of a first example of the second embodiment. FIG. 19 shows a vibration plate 1D of a second example of the second embodiment. The vibration plates 1C, 1D of the second embodiment can be applied to the musical instrument MI shown in FIG. 1 and FIG. 2, as with the vibration plate 1 of the first embodiment.

Figure 19:
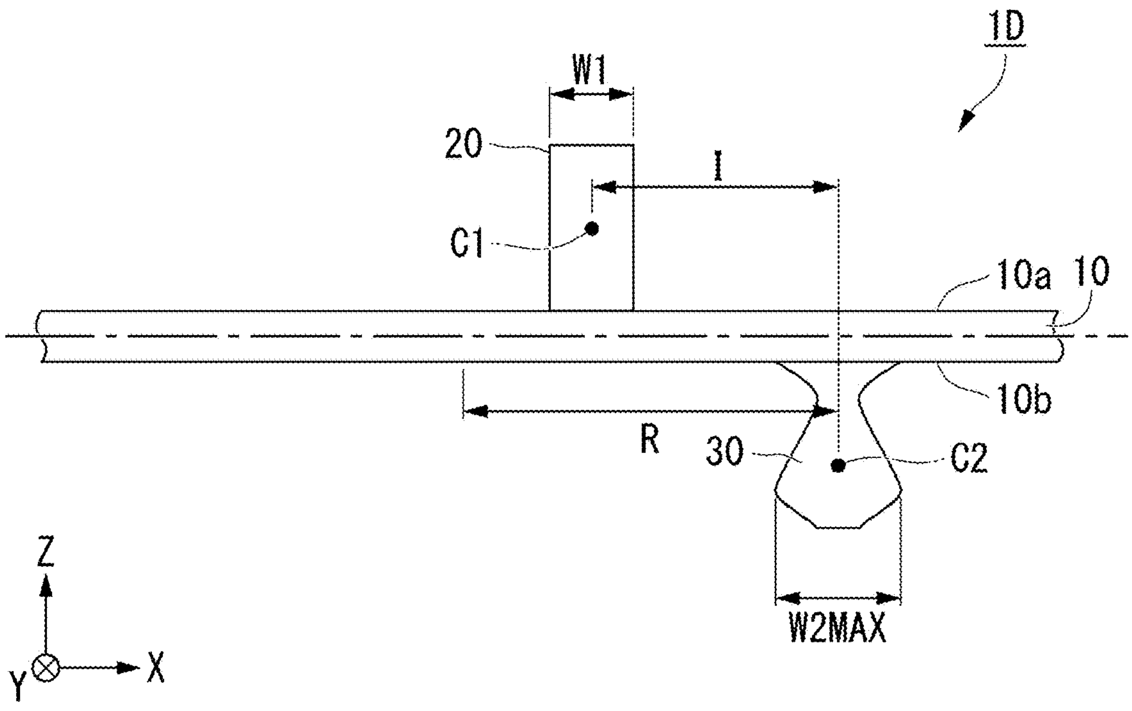
FIG. 19 is a cross-sectional view showing a second example of the vibration plate of the second embodiment of the present disclosure.

The vibration plates 1C, 1D shown in FIG. 18 and FIG. 19 both include a vibration plate main body 10, a first reinforcing member 20, and a second reinforcing member 30, as with the first embodiment. The vibration plate main body 10 is the same as that of the first embodiment.

In the vibration plate 1C shown in FIG. 18, the first reinforcing member 20 is formed in the same manner as that of the first reinforcing member 20 illustrated in FIG. 13. That is to say, the first reinforcing member 20 linearly extends mainly in the first direction Y, and the width dimension thereof increases with approach from one end side to the other end side in the lengthwise direction (from left end side to right end side in FIG. 13). Also, the second reinforcing member 30 is formed in the same manner as that of the second reinforcing member 30 illustrated in FIG. 13. That is to say, the second reinforcing member 30 extends mainly in the first direction Y while bending (meandering) in the second direction X. The width dimension of the second reinforcing member 30 is constant over the entire second reinforcing member 30 in the lengthwise direction thereof. The maximum dimension WIMAX (maximum width dimension WIMAX) in the widthwise direction of the first reinforcing member 20 is greater than the width dimension of the second reinforcing member 30.

In the vibration plate 1D shown in FIG. 19, the first reinforcing member 20 and the second reinforcing member 30 have the same cross-sectional shapes as those of the first reinforcing member 20 and the second reinforcing member 30 illustrated respectively in FIG. 15. The maximum dimension W2MAX (maximum width dimension W2MAX) in the widthwise direction of the second reinforcing member 30 is greater than the width dimension W1 of the first reinforcing member 20.

In the vibration plates 1C, 1D of the second embodiment shown in FIG. 18 and FIG. 19, the first reinforcing member 20 and the second reinforcing member 30 are arranged having a clearance therebetween in the widthwise direction thereof (mainly in the second direction X). For this reason, the first reinforcing member 20 and the second reinforcing member 30 do not overlap with each other in the thickness direction Z of the vibration plate main body 10.

A clearance I in the widthwise direction between the first reinforcing member 20 and the second reinforcing member 30 is no more than three times the maximum dimension of either one of the first reinforcing member 20 and the second reinforcing member 30 in the cross section orthogonal to the lengthwise direction thereof. Here, the widthwise clearance I between the first reinforcing member 20 and the second reinforcing member 30 is a distance between the centroid C1 of the first reinforcing member 20 and the centroid C2 of the second reinforcing member 30 in the cross section orthogonal to the lengthwise direction. The maximum dimension in the cross section of one reinforcing member may be, for example, the maximum dimension in the widthwise direction (maximum width dimension) of the one reinforcing member, or the maximum dimension in the heightwise direction of the one reinforcing member (maximum height dimension), for example.

In the vibration plate 1C shown in FIG. 18, the widthwise clearance I between the first reinforcing member 20 and the second reinforcing member 30 is not more than three times the maximum width dimension WIMAX of the first reinforcing member 20.

Reference symbol R in FIG. 18 denotes an example of a range three times the maximum width dimension WIMAX of the first reinforcing member 20 starting from the centroid C1 of the first reinforcing member 20. Accordingly, FIG. 18 shows that the widthwise clearance I between the first reinforcing member 20 and the second reinforcing member 30 is not more than three times the maximum width dimension WIMAX of the first reinforcing member 20.

In the vibration plate 1D shown in FIG. 19, the widthwise clearance I between the first reinforcing member 20 and the second reinforcing member 30 is not more than three times the maximum width dimension W2MAX of the second reinforcing member 30. Reference symbol R in FIG. 19 denotes an example of a range three times the maximum width dimension W2MAX of the second reinforcing member 30 starting from the centroid C2 of the second reinforcing member 30. Accordingly, FIG. 19 shows that the widthwise clearance I between the first reinforcing member 20 and the second reinforcing member 30 is not more than three times the maximum width dimension W2MAX of the second reinforcing member 30.

As described above, in the vibration plates 1C, 1D of the second embodiment, as with the first embodiment, on the first face 10*a* of the vibration plate main body 10 there is provided the elongated first reinforcing member 20 that projects from the first face 10*a* and extends in the direction (first direction Y) in which deformation (expansion/contraction deformation and/or bending deformation) is likely to occur in the vibration plate main body 10. Moreover, on the second face 10*b* of the vibration plate main body 10 there is provided the elongated second reinforcing member 30 that projects from the second face 10*b* and extends in the direction in which deformation (expansion/contraction deformation and/or bending deformation) is likely to occur in the vibration plate main body 10. The first reinforcing member 20 and the second reinforcing member 30 are arranged with a clearance therebetween in the widthwise direction of the reinforcing members 20, 30 as viewed from the thickness direction Z of the vibration plate main body 10. The clearance in the widthwise direction between the first reinforcing member 20 and the second reinforcing member 30 is no more than three times the maximum dimension of either one of the first and second reinforcing members 20, 30 in the cross section orthogonal to the lengthwise direction thereof. As a result, as with the first embodiment, the first and second reinforcing members 20, 30 effectively prevent the vibration plate main body 10 from expanding/contracting in the direction in which expansion/contraction deformation is likely to occur therein, or from bending in the direction in which bending deformation is likely to occur.

Moreover, in the vibration plates 1C, 1D of the second embodiment, the same effect as that of the first embodiment can be obtained. Furthermore, in the musical instrument MI (see FIG. 1 and FIG. 2) having the vibration plates 1C, 1D of the second embodiment applied thereto, the same effect as that of the first embodiment can be obtained.

Except that the first and second reinforcing members 20, 30 are arranged having a clearance therebetween in the widthwise direction thereof, the aspect of the reinforcing members in the second embodiment may be the same as that of the first embodiment (for example, FIG. 4 to FIG. 6) or those of modified examples thereof (for example, FIG. 8 to FIG. 17).

The present disclosure has been described in detail above, however, the present disclosure is not limited to the above embodiments, and various modifications may be made without departing from the scope of the present disclosure.

Figure 20:
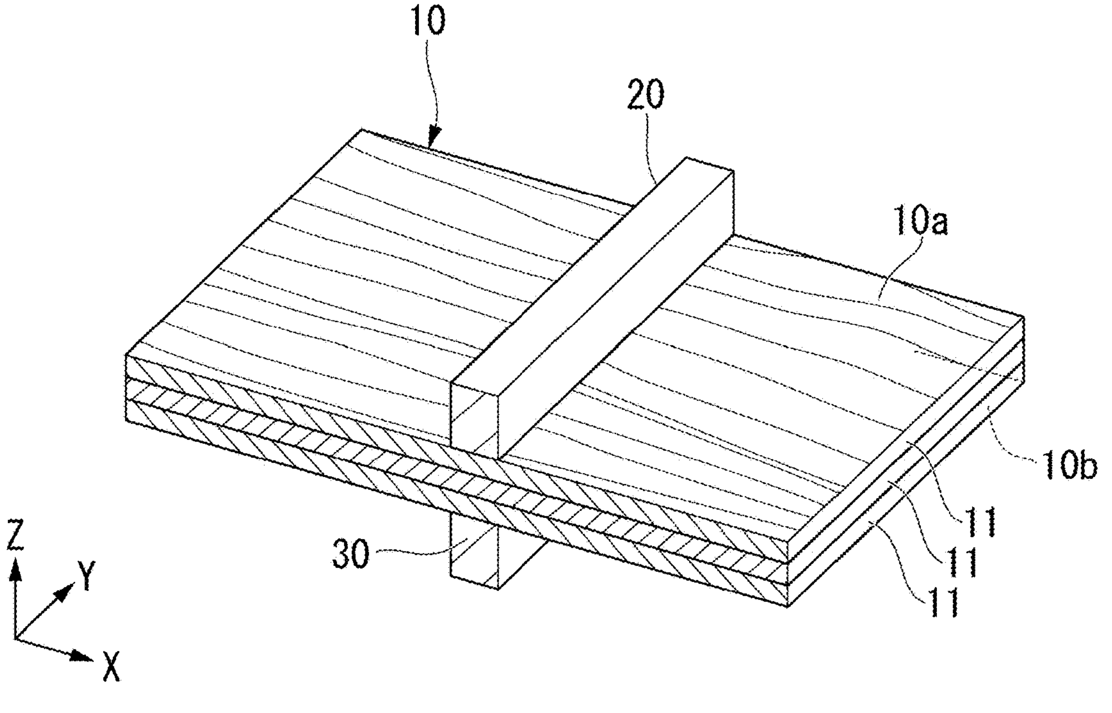
FIG. 20 is a perspective view showing a main part of a vibration plate of another embodiment of the present disclosure.

In the present disclosure, the vibration plate main body 10 is not limited to being one plate member, and may be a plywood plate in which a plurality of (three in the illustrated example) plate members 11 are laminated as shown in FIG. 20, for example. In the vibration plate main body 10 illustrated in FIG. 20, the plate members 11 are wooden plates 11. The plurality of wooden plates 11 each have wood grains extending along the first face 10*a* and the second face 10*b* of the vibration plate main body 10. The wood-grain directions of the plurality of wooden plates 11 may, for example, be aligned with each other, or may, for example, intersect with each other. For example, the wood-grain direction of a predetermined wooden plate 11 may intersect with the wood-grain direction of the other two wooden plates 11 sandwiching the predetermined wooden plate 11, and the wood-grain direction of the other two wooden plates 11 may be aligned with each other. The vibration plate main body 10 in which three plate members 11 are laminated has a bending deformation anisotropy. Specifically, bending deformation is more likely to occur in the first direction Y than the second direction X.

In the case where the vibration plate main body 10 is the plywood plate mentioned above, the first reinforcing member 20 provided on the first face 10*a* and the second reinforcing member 30 provided on the second face 10*b* may extend in a direction that intersects with (for example, orthogonal to) the wood-grain direction of at least one of the wooden plates 11, along the first face 10*a* and the second face 10*b*. That is to say, the first and second reinforcing members 20, 30 may extend in a direction in which at least one of the wooden plates 11 is likely to undergo expansion/contraction deformation. In FIG. 20, the first and second reinforcing members 20, 30 extend in the direction orthogonal to the wood-grain direction of the wooden plate 11 constituting the first face 10*a* of the vibration plate main body 10.

Even in the case where the vibration plate main body 10 is a plywood plate, by providing the first and second reinforcing members 20, 30 in the manner described above, it is possible by means of the first and second reinforcing members 20, 30 to effectively prevent the vibration plate main body 10 from bending in the direction in which bending deformation is likely to occur (bending deformation of the vibration plate main body 10), as with the first and second embodiments.

The vibration plate of the present disclosure can be applied not only to keyboard instruments such as the piano illustrated in FIG. 1 and FIG. 2, but also to other musical instruments having a vibration plate such as stringed musical instruments and percussion instruments (for example, cajon).

According to the present disclosure, it is possible to suppress expansion/contraction deformation and/or bending deformation of a vibration plate.

What is claimed is:

1. A vibration plate for a musical instrument, the vibration plate comprising:

a plate-shaped vibration plate main body;

a first elongated reinforcing member disposed on a first face of the vibration plate main body, and that projects outwardly from the first face and extends along the first face in a direction that prevents the vibration plate main body from deforming; and a second elongated reinforcing member disposed on a second face of the vibration plate main body, and that projects outwardly from the second face and extends along the second face in the direction that prevents the vibration plate main body from deforming.

2. The vibration plate according to claim 1, wherein, as viewed from the thickness direction of the vibration plate main body, at least the part of the first elongated reinforcing member overlaps with at least the part of the second elongated reinforcing member over an entire length of at least one of the first elongated reinforcing member or the second elongated reinforcing member.

3. The vibration plate according to claim 1, wherein:

the vibration plate main body comprises wood having a wood grain extending along the first face and the second face, and the first elongated reinforcing member and the second elongated reinforcing member extend in a direction crossing a direction of the wood grain.

4. The vibration plate according to claim 1, wherein:

the vibration plate main body comprises a plurality of laminated wooden plates, each of the plurality of the wooden plates has a wood grain extending along the first face and the second face, and the first elongated reinforcing member and the second elongated reinforcing member extend in a direction crossing a direction of the wood grain of at least one of the plurality of the wooden plates.

5. The vibration plate according to claim 1, wherein a stiffness of the first elongated reinforcing member and a stiffness of the second elongated reinforcing member are equal to each other.

6. The vibration plate according to claim 1, wherein the first elongated reinforcing member and the second elongated reinforcing member comprise a same material.

7. The vibration plate according to claim 5, wherein:

a cross-sectional area of the first elongated reinforcing member and a cross-sectional area of the second elongated reinforcing member are equal to each other, the cross-sectional area of the first elongated reinforcing member is orthogonal to a lengthwise direction of the first elongated reinforcing member, and the cross-sectional area of the second elongated reinforcing member is orthogonal to a lengthwise direction of the second elongated reinforcing member.

8. The vibration plate according to claim 1, wherein the first elongated reinforcing member and the second elongated reinforcing member are line-symmetrical to each other in lengthwise directions of the first elongated reinforcing member and the second elongated reinforcing member.

9. A vibration plate for a musical instrument, the vibration plate comprising:

a plate-shaped vibration plate main body;

a first elongated reinforcing member disposed on a first face of the vibration plate main body, and that projects outwardly from the first face and extends along the first face in a direction that prevents the vibration plate main body from deforming; and a second elongated reinforcing member disposed on a second face of the vibration plate main body, and that projects outwardly from the second face and extends along the second face in the direction that prevents the vibration plate main body from deforming, wherein the first elongated reinforcing member and the second elongated reinforcing member are laterally spaced apart as viewed from a thickness direction of the vibration plate main body, and wherein the lateral spacing between the first elongated reinforcing member and the second elongated reinforcing member is equal to or less than three times a maximum dimension of a cross section of the first elongated reinforcing member, the cross section being orthogonal to a lengthwise direction of the first elongated reinforcing member.

10. A musical instrument comprising:

a vibration plate comprising:

a plate-shaped vibration plate main body;

a first elongated reinforcing member disposed on a first face of the vibration plate main body, and that projects outwardly from the first face and extends along the first face in a direction that prevents the vibration plate main body from deforming; and a second elongated reinforcing member disposed on a second face of the vibration plate main body, and that projects outwardly from the second face and extends along the second face in the direction that prevents the vibration plate main body from deforming; and a vibrator configured to vibrate the vibration plate main body.

* * * * *